US012665712B2

(12) United States Patent　　　　(10) Patent No.:　US 12,665,712 B2

Islam et al.　　　　(45) Date of Patent:　Jun. 23, 2026

(54) METHOD FOR DEFINING UPLINK (UL) TRANSMISSION TIMING ACCURACY

(71) Applicant: QUALCOMM Incorporated, San Diego, CA (US)

(72) Inventors: Muhammad Nazmul Islam, Littleton, MA (US); Prashant Sharma, San Jose, CA (US); Jing Lei, San Diego, CA (US); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1010 days.

(21) Appl. No.: 17/813,245

(22) Filed: Jul. 18, 2022

(65) Prior Publication Data

US 2023/0043974 A1　　Feb. 9, 2023

Related U.S. Application Data

(60) Provisional application No. 63/229,367, filed on Aug. 4, 2021.

(51) Int. Cl.
　　*H04L 5/00*　　　　(2006.01)
　　*H04W 24/08*　　　(2009.01)
(52) U.S. Cl.
　　CPC .......... *H04L 5/0048* (2013.01); *H04L 5/0078* (2013.01); *H04W 24/08* (2013.01)

(58) Field of Classification Search
　　CPC ..................................................... H04L 5/0048
　　See application file for complete search history.

(56) References Cited

U.S. PATENT DOCUMENTS

| | | | |
|---|---|---|---|
| 2019/0182000 A1* | 6/2019 | Futaki | ..................... H04L 5/005 |
| 2021/0067990 A1 | 3/2021 | Opshaug et al. | |
| 2021/0153193 A1* | 5/2021 | Lin | ................... H04W 56/0045 |

FOREIGN PATENT DOCUMENTS

WO　　　2019098924 A1　　5/2019

OTHER PUBLICATIONS

International Search Report and Written Opinion—PCT/US2022/073971—ISA/EPO—Jan. 2, 2023.
Partial International Search Report—PCT/US2022/073971—ISA/EPO—Nov. 4, 2022.

\* cited by examiner

*Primary Examiner* — Abdeltif Ajid
(74) *Attorney, Agent, or Firm* — Dinsmore & Shohl LLP

(57) ABSTRACT

Certain aspects of the present disclosure provide techniques for wireless communications by a user equipment (UE). The UE detects at least one of a first type of reference signal (RS) or a second type of RS within an active bandwidth part (BWP). The UE then derives uplink (UL) transmission timing and corresponding accuracy requirement, based on which type of RS was detected. The UE then transmits UL signals based on the derived UL transmission timing and the corresponding accuracy requirement.

29 Claims, 16 Drawing Sheets

Timing Error Limit Table

| Frequency Range | SCS of SSB signals (kHz) | SCS of uplink signals (kHz) | $T_e$ |
|---|---|---|---|
| 1 | 15 | 15 | $12*64*T_c$ |
| | | 30 | $10*64*T_c$ |
| | | 60 | $10*64*T_c$ |
| | 30 | 15 | $8*64*T_c$ |
| | | 30 | $8*64*T_c$ |
| | | 60 | $7*64*T_c$ |
| 2 | 120 | 60 | $3.5*64*T_c$ |
| | | 120 | $3.5*64*T_c$ |
| | 240 | 60 | $3*64*T_c$ |
| | | 120 | $3*64*T_c$ |

Note 1: $T_c$ is the basic timing unit defined in TS 38.211 [6]

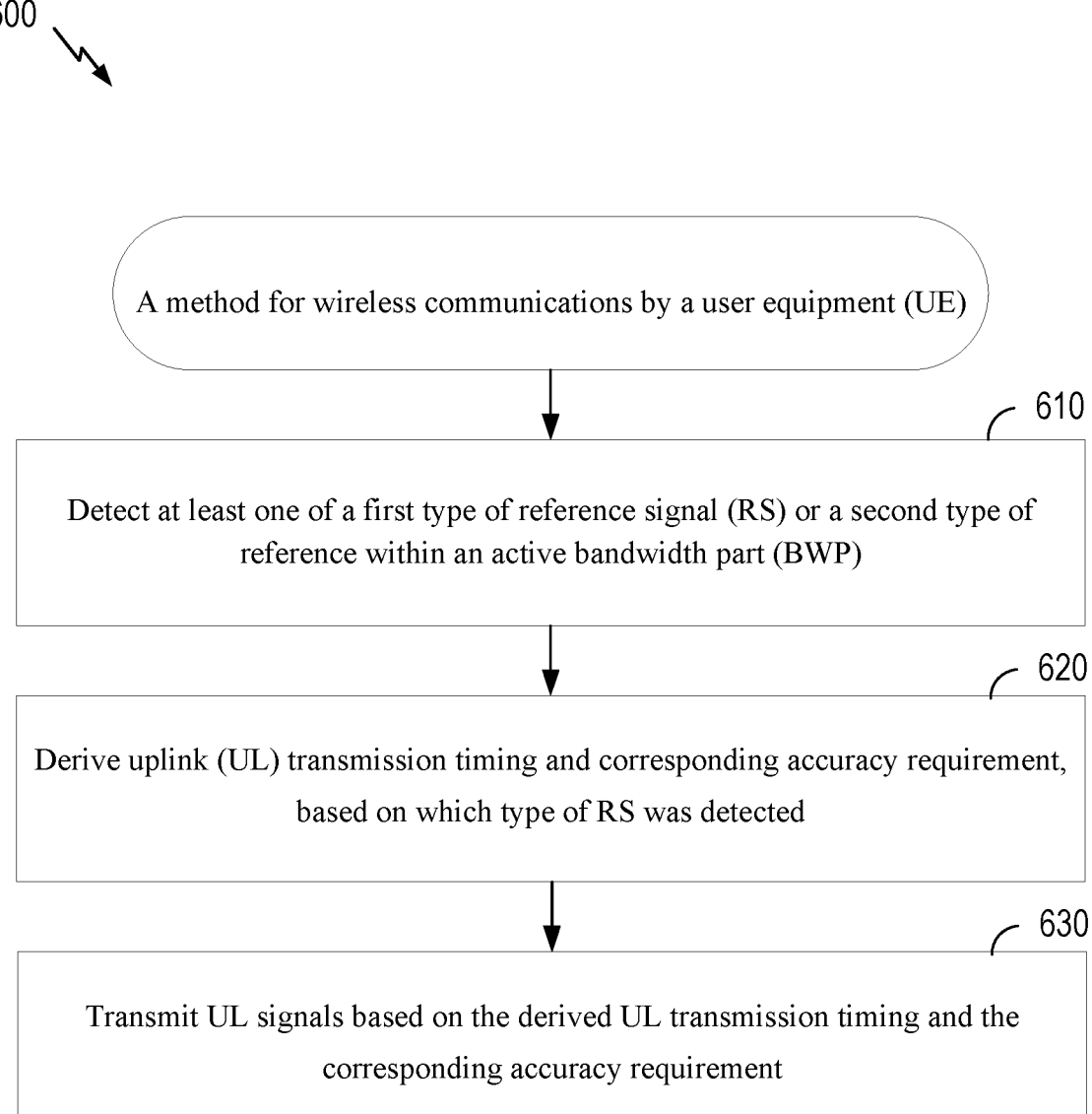

A method for wireless communications by a user equipment (UE)

610

Detect at least one of a first type of reference signal (RS) or a second type of reference within an active bandwidth part (BWP)

620

Derive uplink (UL) transmission timing and corresponding accuracy requirement, based on which type of RS was detected

630

Transmit UL signals based on the derived UL transmission timing and the corresponding accuracy requirement

*FIG. 6*

700
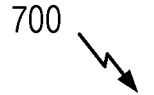

A method for wireless communications by a network entity

710

Send, to a user equipment (UE), an indication to select at least one of a first type of reference signal (RS) or a second type of RS for deriving an uplink (UL) transmission timing and corresponding accuracy requirement, when both the first type of RS and the second type of RS are present within an active bandwidth part (BWP)

720

Receive, from the UE, UL signals based on the derived UL transmission timing and the corresponding accuracy requirement

RS (a first type of RS (SSB),
a second type of RS (TRS, CSI-RS),
or both)

804

Detect at least one of the first type
of RS or the second type of RS
within an active BWP

806

Derive UL transmission timing
and corresponding accuracy
requirement based on which type
of RS was detected

808

UL signals based on derived UL transmission
timing

900

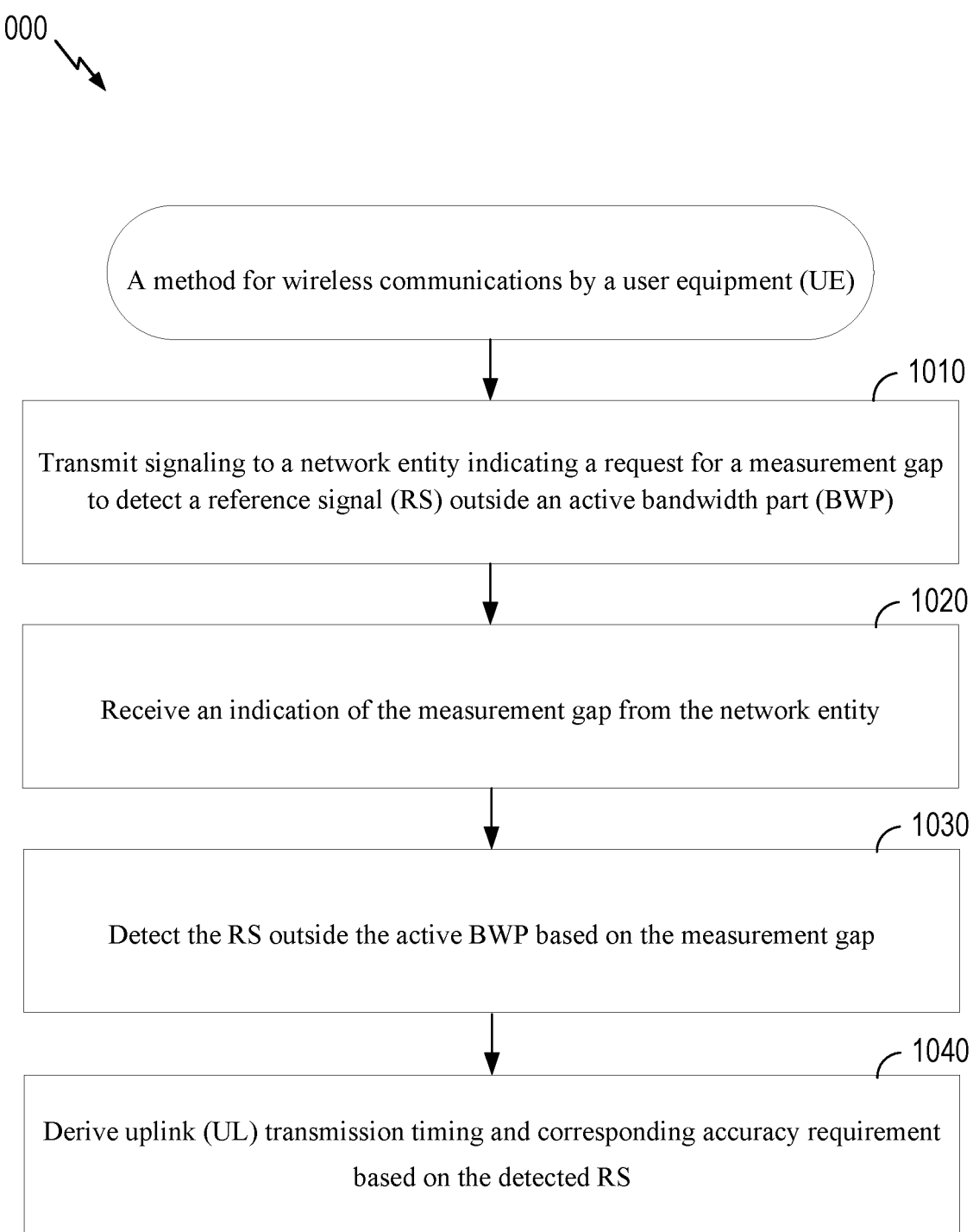

1000

A method for wireless communications by a user equipment (UE)

1010

Transmit signaling to a network entity indicating a request for a measurement gap to detect a reference signal (RS) outside an active bandwidth part (BWP)

1020

Receive an indication of the measurement gap from the network entity

1030

Detect the RS outside the active BWP based on the measurement gap

1040

Derive uplink (UL) transmission timing and corresponding accuracy requirement based on the detected RS

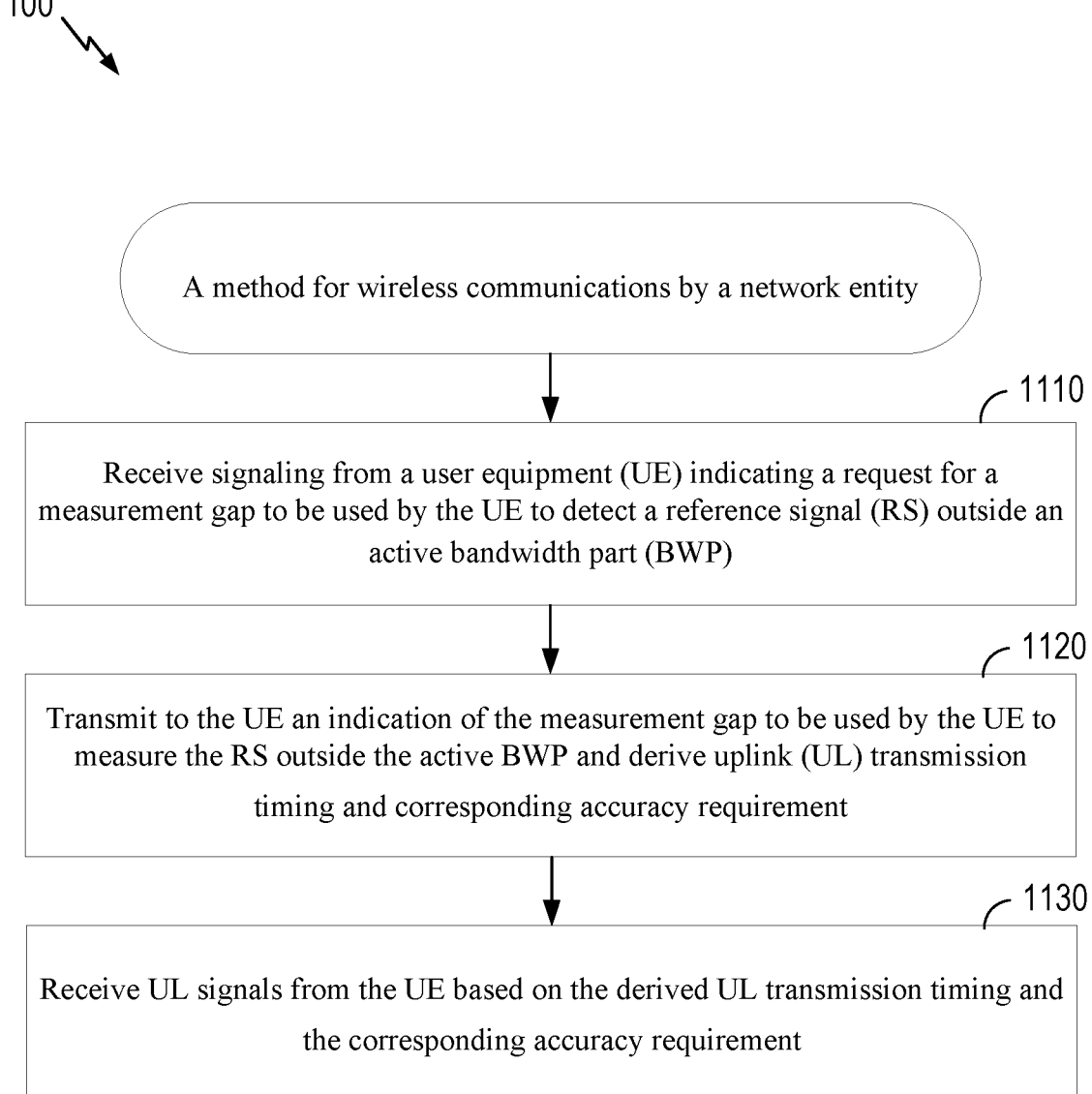

A method for wireless communications by a network entity

1110

Receive signaling from a user equipment (UE) indicating a request for a measurement gap to be used by the UE to detect a reference signal (RS) outside an active bandwidth part (BWP)

1120

Transmit to the UE an indication of the measurement gap to be used by the UE to measure the RS outside the active BWP and derive uplink (UL) transmission timing and corresponding accuracy requirement

1130

Receive UL signals from the UE based on the derived UL transmission timing and the corresponding accuracy requirement

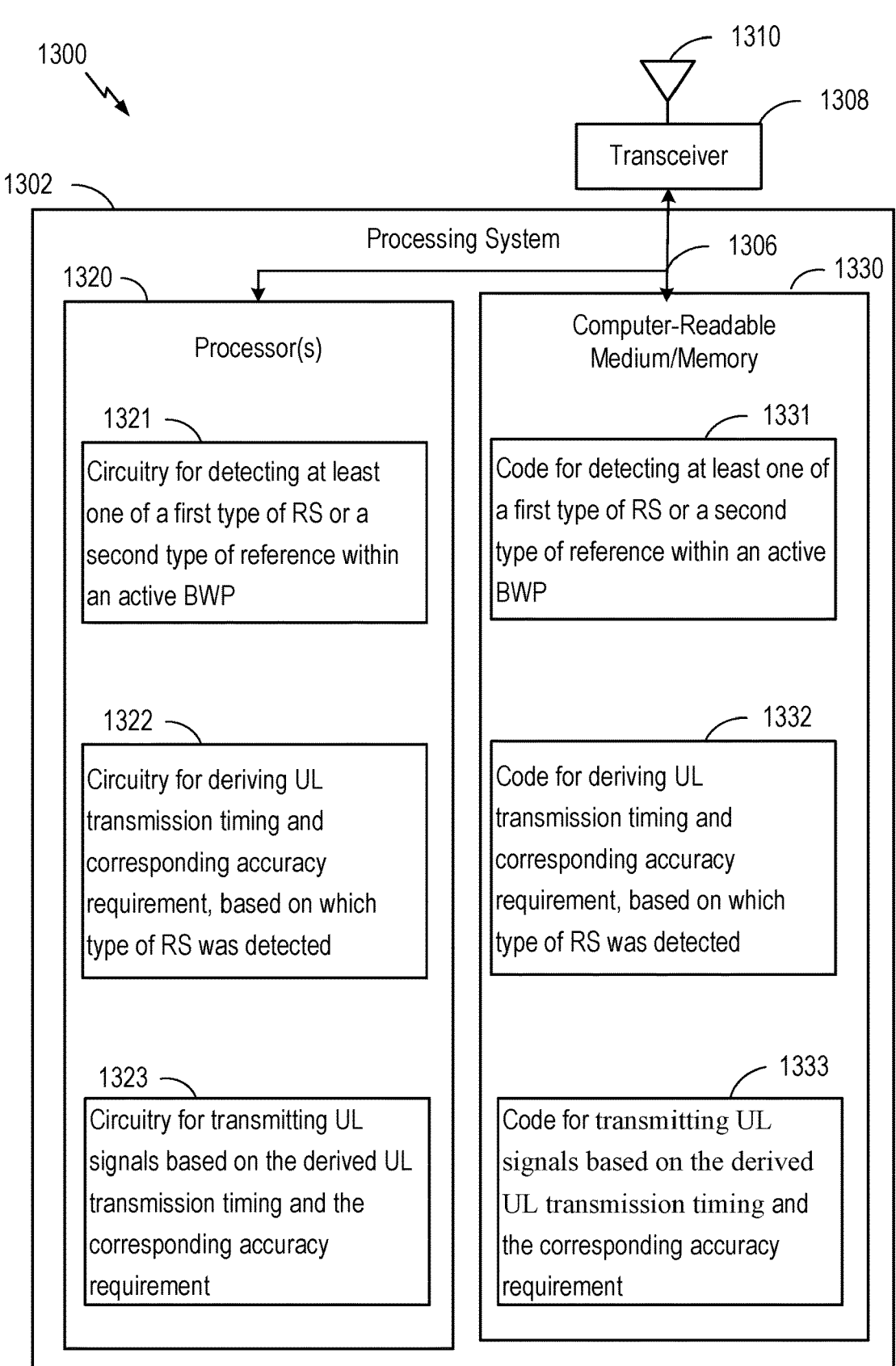

1300

1310

1308

Transceiver

1302

Processing System     1306     1330

1320

Processor(s)

Computer-Readable
Medium/Memory

1321

Circuitry for detecting at least
one of a first type of RS or a
second type of reference within
an active BWP

1331

Code for detecting at least one of
a first type of RS or a second
type of reference within an active
BWP

1322

Circuitry for deriving UL
transmission timing and
corresponding accuracy
requirement, based on which
type of RS was detected

1332

Code for deriving UL
transmission timing and
corresponding accuracy
requirement, based on which
type of RS was detected

1323

Circuitry for transmitting UL
signals based on the derived UL
transmission timing and the
corresponding accuracy
requirement

1333

Code for transmitting UL
signals based on the derived
UL transmission timing and
the corresponding accuracy
requirement

*FIG. 13*

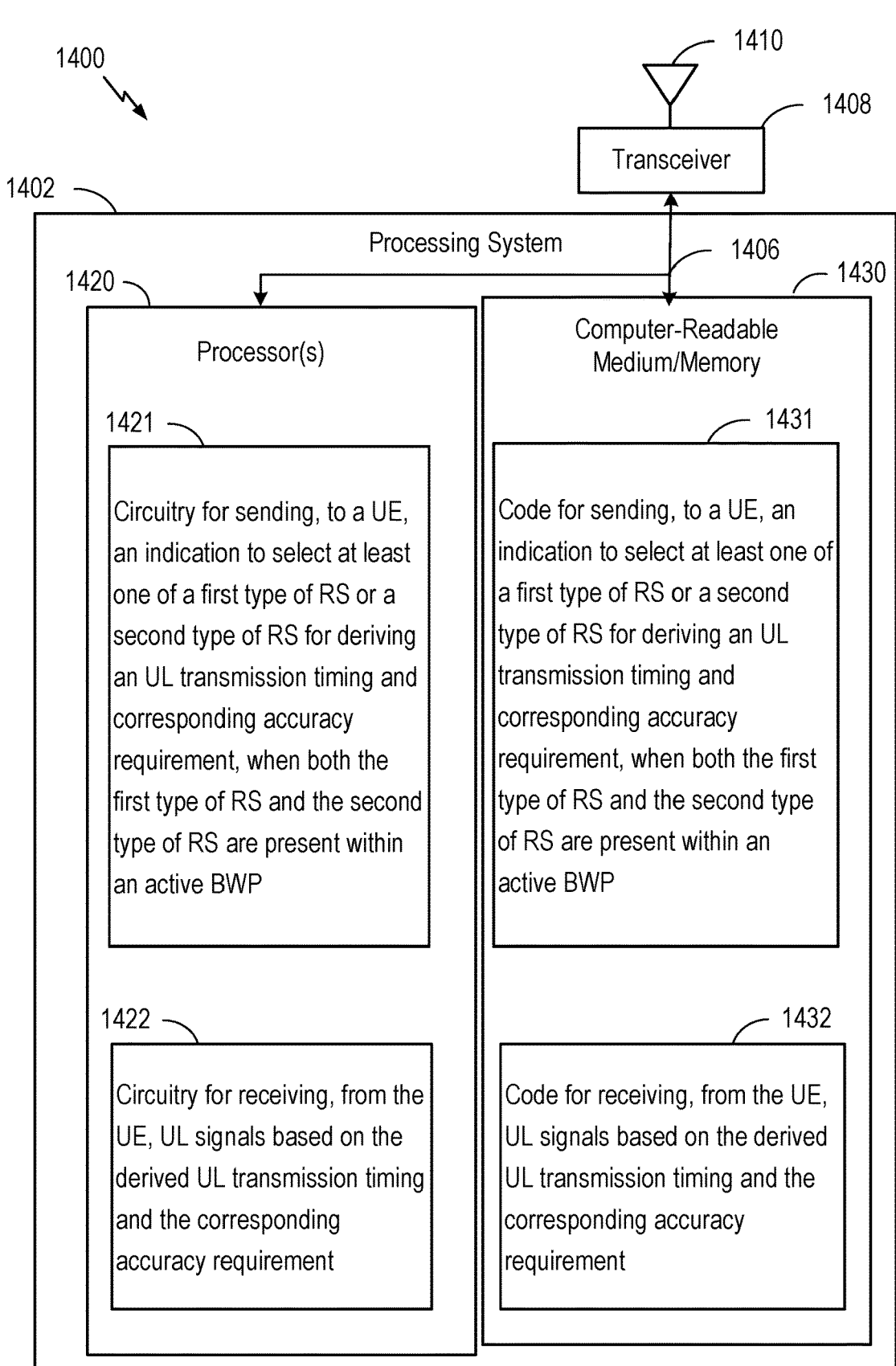

1400

1410

1408

Transceiver

1402

Processing System

1406

1430

1420

Processor(s)

Computer-Readable
Medium/Memory

1421

Circuitry for sending, to a UE, an indication to select at least one of a first type of RS or a second type of RS for deriving an UL transmission timing and corresponding accuracy requirement, when both the first type of RS and the second type of RS are present within an active BWP

1431

Code for sending, to a UE, an indication to select at least one of a first type of RS or a second type of RS for deriving an UL transmission timing and corresponding accuracy requirement, when both the first type of RS and the second type of RS are present within an active BWP

1422

Circuitry for receiving, from the UE, UL signals based on the derived UL transmission timing and the corresponding accuracy requirement

1432

Code for receiving, from the UE, UL signals based on the derived UL transmission timing and the corresponding accuracy requirement

FIG. 14

METHOD FOR DEFINING UPLINK (UL) TRANSMISSION TIMING ACCURACY

CROSS-REFERENCE TO RELATED APPLICATION

This application claims benefit of and priority to U.S. Provisional Patent Application No. 63/229,367, filed Aug. 4, 2021, which is hereby incorporated by reference in its entirety.

INTRODUCTION

Aspects of the present disclosure relate to wireless communications, and more particularly, to techniques for defining uplink (UL) transmission timing accuracy based on a presence of reference signals (RSs) in an active bandwidth part (BWP).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE), including: detecting at least one of a first type of reference signal (RS) or a second type of reference within an active bandwidth part (BWP); deriving uplink (UL) transmission timing and corresponding accuracy requirement, based on which type of RS was detected; and transmitting UL signals based on the derived UL transmission timing and the corresponding accuracy requirement.

Another aspect provides a method for wireless communications by a network entity, including: sending, to a UE, an indication to select at least one of a first type of RS or a second type of RS for deriving an UL transmission timing and corresponding accuracy requirement, when both the first type of RS and the second type of RS are present within an active BWP; and receiving, from the UE, UL signals based on the derived UL transmission timing and the corresponding accuracy requirement.

Another aspect provides a method for wireless communications by a UE, including: transmitting signaling to a network entity indicating a request for a measurement gap to detect an RS outside an active BWP; receiving an indication of the measurement gap from the network entity; detecting the RS outside the active BWP based on the measurement gap; and deriving UL transmission timing and corresponding accuracy requirement based on the detected RS.

Another aspect provides a method for wireless communications by a network entity, including: receiving signaling from a UE indicating a request for a measurement gap to be used by the UE to detect an RS outside an active BWP; transmitting to the UE an indication of the measurement gap to be used by the UE to measure the RS outside the active BWP and derive UL transmission timing and corresponding accuracy requirement; and receiving UL signals from the UE based on the derived UL transmission timing and the corresponding accuracy requirement.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 5 illustrates example timing error limit table.

FIG. 6 depicts a flow diagram illustrating example operations for wireless communication by a UE.

FIG. 7 depicts a flow diagram illustrating example operations for wireless communication by a network entity.

FIG. 10 depicts a flow diagram illustrating example operations for wireless communication by a UE.

FIG. 11 depicts a flow diagram illustrating example operations for wireless communication by a network entity.

FIG. 13 depicts aspects of an example communications device.

FIG. 14 depicts aspects of an example communications device.

DETAILED DESCRIPTION

Aspects of the present disclosure provide apparatuses, methods, processing systems, and computer-readable mediums for defining uplink (UL) transmission timing accuracy for a user equipment (UE) based on a presence of reference signals (RSs) in an active bandwidth part (BWP).

Different types of RS may allow a UE to track timing with different levels of accuracy. Therefore, the UL transmission timing accuracy may be determined based on the type or types of RS the UE is able to detect (and has available for time tracking). For example, the UE may detect a first type of RS (e.g., a synchronization signal block (SSB)), a second type of RS (e.g., a tracking reference signal (TRS) and/or a channel state information reference signal (CSI-RS)), or both the first and second types of RS, within an active BWP. The UE may then derive UL transmission timing (and a corresponding accuracy requirement) based on which type (or types) of RS was detected. The UE then sends UL signals to a network entity based on the derived UL transmission timing.

Introduction to Wireless Communication Networks

Figure 1:
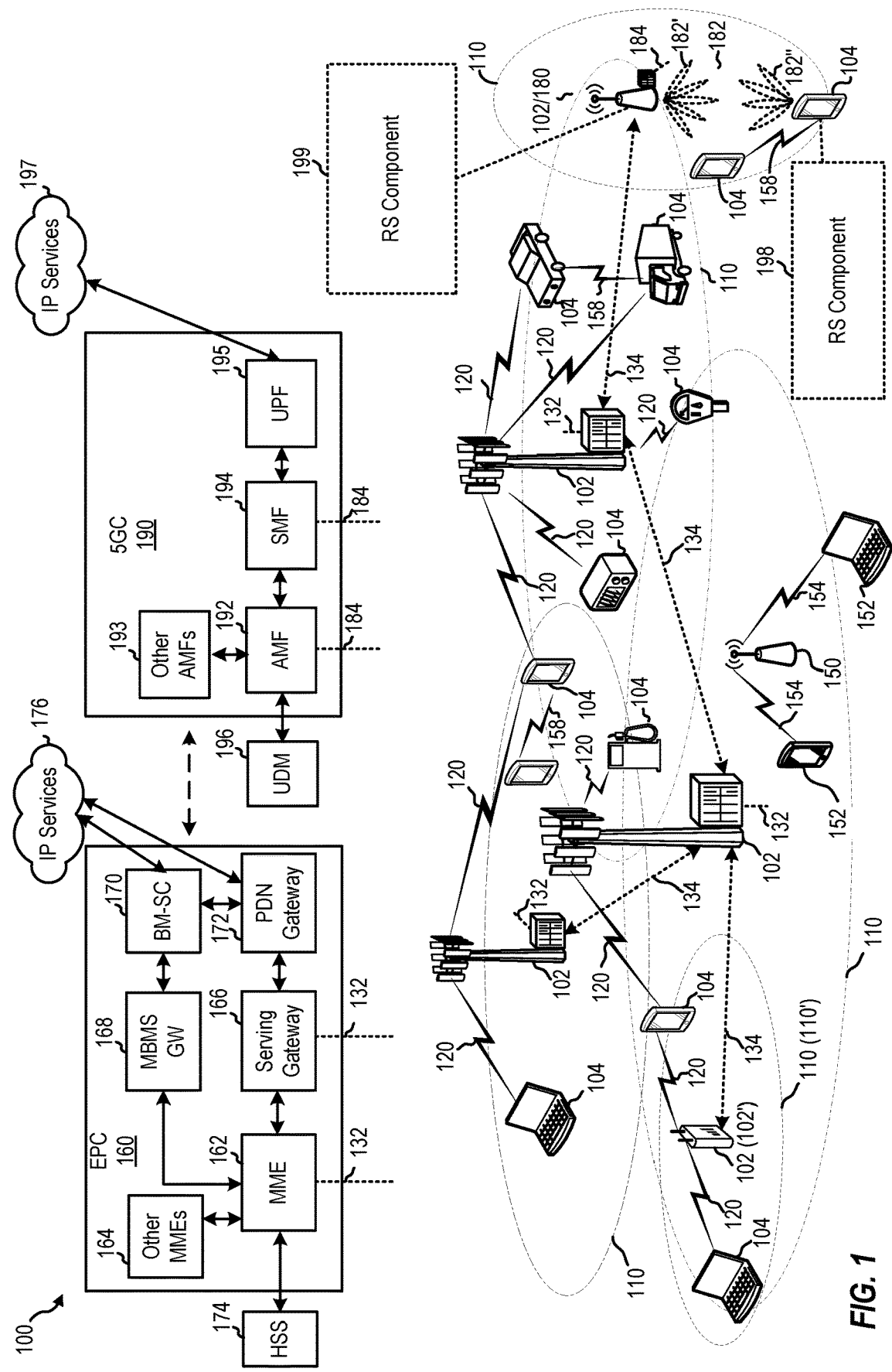
FIG. 1 is a block diagram conceptually illustrating an example wireless communication network.

FIG. 1 depicts an example of a wireless communication network 100, in which aspects described herein may be implemented.

For example, wireless communication network 100 may include a reference signal (RS) component 199, which may be configured to perform, or cause a base station (BS) 102 to perform, operations 700 of FIG. 7. Wireless communication network 100 may also include an RS component 198, which may be configured to perform, or cause a user equipment (UE) 104 to perform, operations 600 of FIG. 6.

Generally, wireless communication network 100 includes BSs 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs 102 may utilize beamforming 182 with a UE 104 to improve path loss and range. For example, the BS 102 and the UE 104 may each include a plurality of antennas, such as antenna elements, antenna panels, and/or antenna arrays to facilitate the beamforming.

In some cases, a BS 102 may transmit a beamformed signal to a UE 104 in one or more transmit directions 182'. The UE 104 may receive the beamformed signal from the BS 102 in one or more receive directions 182". The UE 104 may also transmit a beamformed signal to the BS 102 in one or more transmit directions 182". The BS 102 may also receive the beamformed signal from the UE 104 in one or more receive directions 182'. The BS 102 and the UE 104 may then perform beam training to determine the best receive and transmit directions for each of BS 102 and UE 104. Notably, the transmit and receive directions for the BS 102 may or may not be the same. Similarly, the transmit and receive directions for the UE 104 may or may not be the same.

Figure 2:
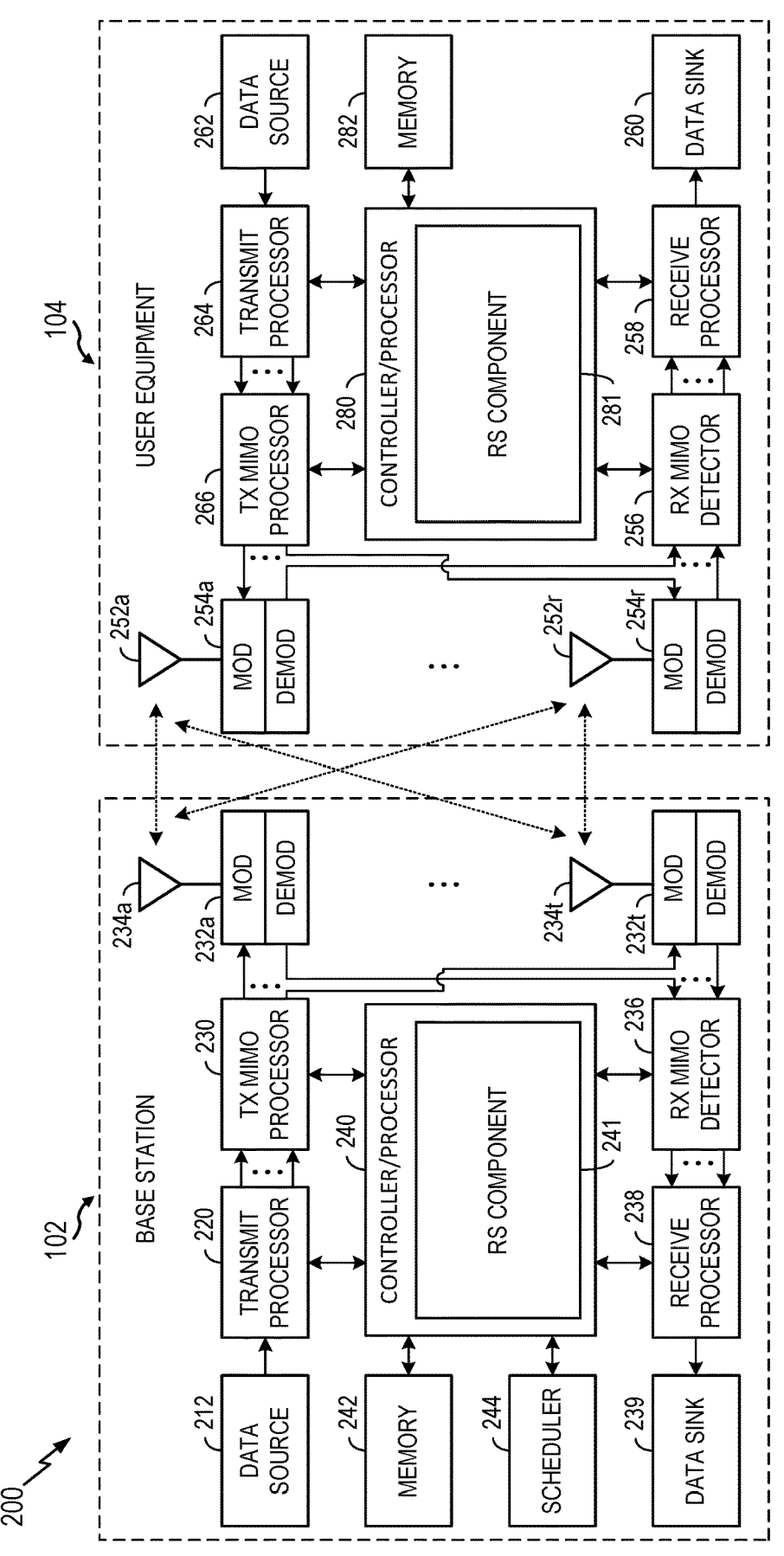
FIG. 2 is a block diagram conceptually illustrating aspects of an example base station (BS) and a user equipment (UE).

FIG. 2 depicts aspects of an example BS 102 and a UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes an RS component 241, which may be representative of an RS component 199 of FIG. 1. Notably, while depicted as an aspect of controller/processor 240, the RS component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes an RS component 281, which may be representative of the RS component 198 of FIG. 1. Notably, while depicted as an aspect of controller/processor 280, the RS component 281 may be implemented additionally or alternatively in various other aspects of UE 104 in other implementations.

Figure 3:
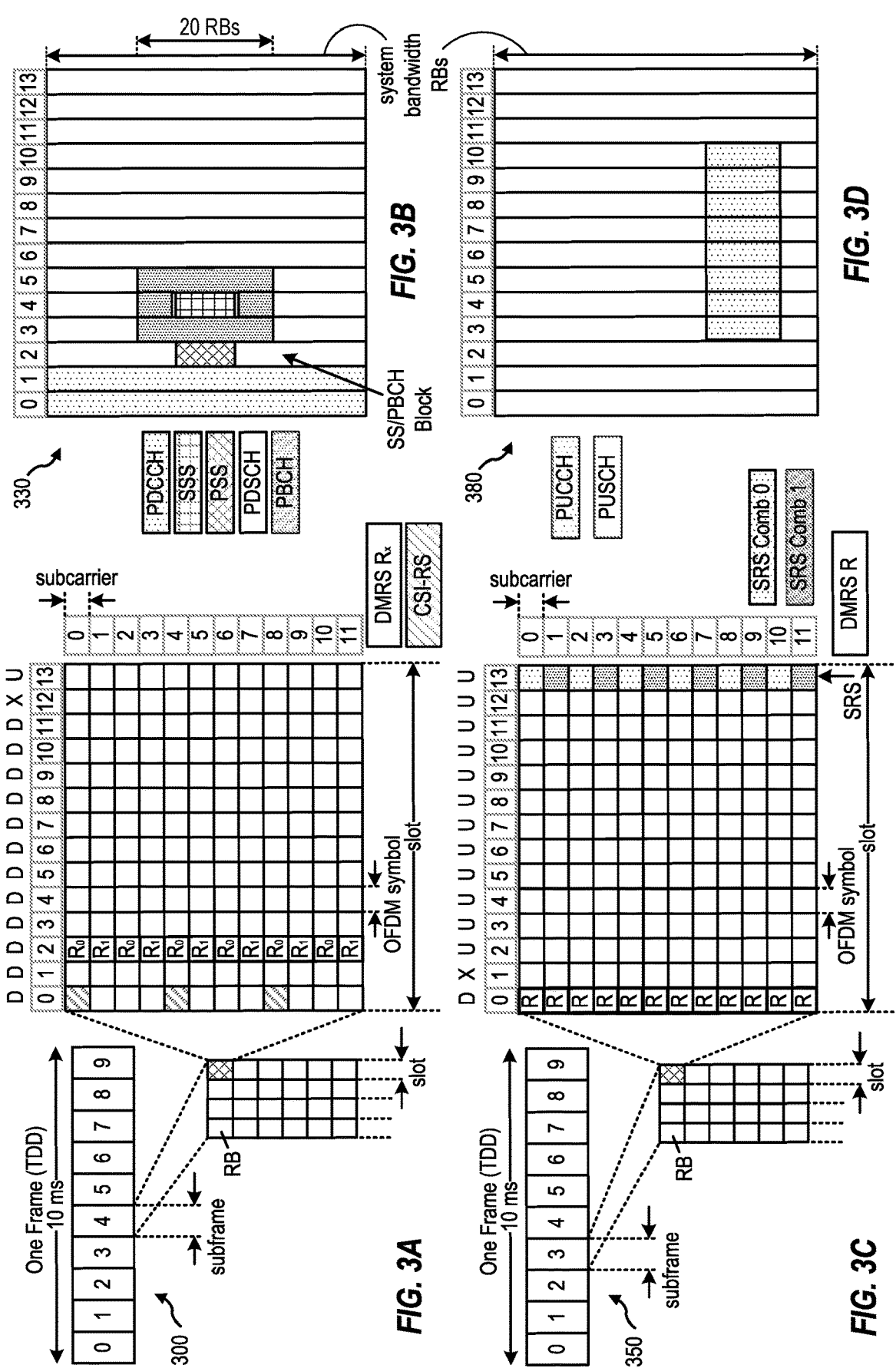
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station (BS) 102 may utilize beamforming 182 with user equipment (UE) 104 to improve path loss and range. To do so, BS 102 and UE 104 may each include a plurality of antennas, such as antenna elements, antenna panels, and/or antenna arrays to facilitate the beamforming.

In some cases, BS 102 may transmit a beamformed signal to UE 104 in one or more transmit directions 182'. UE 104 may receive the beamformed signal from BS 102 in one or more receive directions 182". UE 104 may also transmit a beamformed signal to BS 102 in one or more transmit directions 182". BS 102 may receive the beamformed signal from UE 104 in one or more receive directions 182'. BS 102 and UE 104 may then perform beam training to determine the best receive and transmit directions for each of BS 102 and UE 104. Notably, the transmit and receive directions for BS 102 may or may not be the same. Similarly, the transmit and receive directions for UE 104 may or may not be the same.

Introduction to Reduced Capability (RedCap) Devices

Various technologies may be the focus of current wireless communication standards. For example, Rel-15 and/or Rel-16 may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., Rel-17 and beyond) there may exists a strong desire for new radio (NR) to be scalable and deployable in a more efficient and cost-effective way. Thus, a new user equipment (UE) type with reduced capabilities (RedCap) has been introduced.

A RedCap UE may exhibit a relaxation of peak throughput (e.g., 20 MHz), as well as lower latency and/or reliability requirements. Also, the RedCap UE may involve lower device cost (and complexity) and improved efficiency (e.g. power consumption, system overhead, and cost improvements) as compared to high-end devices, such as high-end eMBB and URLCC devices of 5G NR Rel-15/16 (e.g., high-end smartphones).

Figure 4:
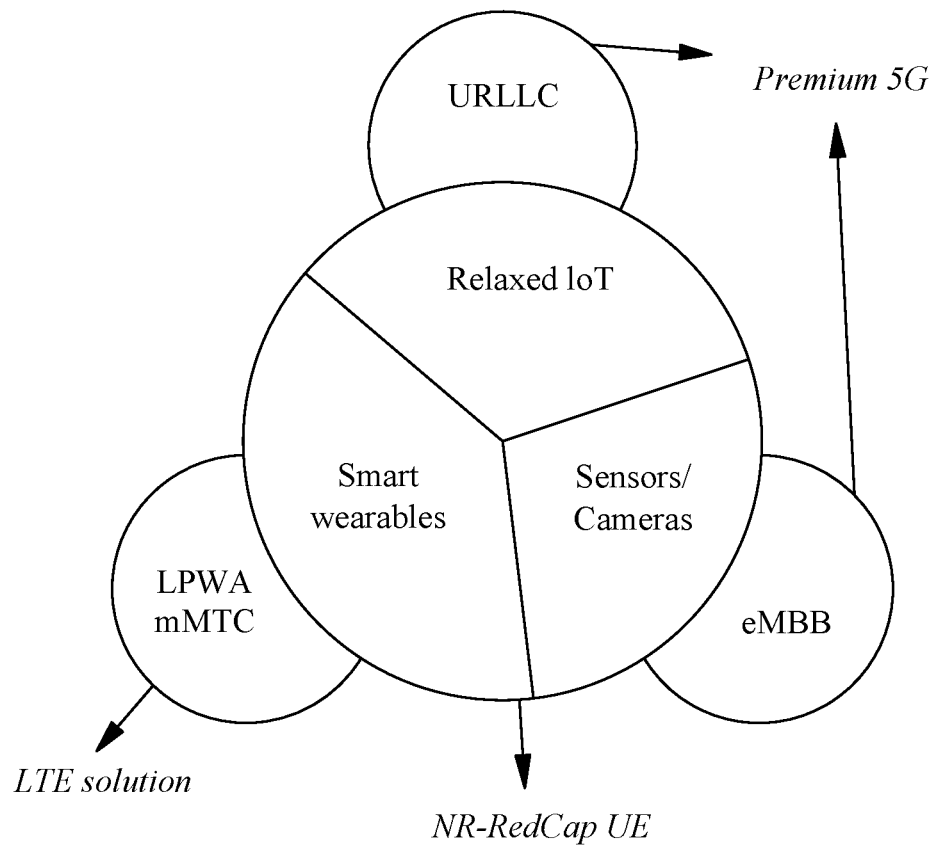
FIG. 4 illustrates example functionality of a reduced capability (RedCap) device.

Some design objectives of an NR RedCap UE may include scalable resource allocation, coverage enhancement for downlink (DL) and/or uplink (UL), power saving in all radio resource control (RRC) states, and/or co-existence with the NR premium UE. As shown in FIG. 4, an NR-RedCap UE may be a smart wearable device, a sensor (e.g., industrial wireless sensor networks), a camera (e.g., a surveillance camera), a low-end smartphone, or any other device configured for relaxed internet-of-things (IoT) communications. Further, a RedCap UE functionality and/or capability may overlap with those of long term evolution (LTE) and/or fifth generation (5G) devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Introduction to UE Transmit Timing

In 5G new radio (NR), a user equipment (UE) may have a capability (and be expected) to follow (track) a frame timing change of a reference cell in a connected state. An uplink (UL) frame transmission may take place before a reception of a first detected path (in time) of a corresponding downlink (DL) frame from the reference cell.

For serving cell(s) in a primary timing advance group (pTAG), the UE may use a special cell (SpCell) as the reference cell for deriving UE transmit timing for cells in the PTAG. For serving cell(s) in a secondary timing advance group (sTAG), the UE may use any activated secondary cell (SCell) as the reference cell for deriving the UE transmit timing for cells in the sTAG.

The UE may be expected to meet UL transmit timing accuracy requirements (e.g., when at least one synchronization signal block (SSB) is available at the UE during last 160 ms). The UE may be expected to meet the UL transmit timing accuracy requirements based on an UL transmission timing error limit.

The UL transmission timing error limit may depend on a sub carrier spacing (SCS) of the SSB and UL signals. Per the UL transmission timing error limit, an initial transmission timing error of the UE has to be less than or equal to a timing error limit value (Te) (e.g., Te specified in a table illustrated in FIG. 5). This may apply to a first transmission in a discontinuous reception (DRX) cycle for a physical uplink control channel (PUCCH), a physical uplink shared channel (PUSCH) and a sounding reference signal (SRS), or it is the physical random access channel (PRACH) transmission, or it is msgA transmission (e.g., a PRACH preamble and a PUSCH transmission). The UE may need to meet the Te requirement for the initial transmission when at least one SSB is available at the UE during the last 160 ms.

The UE (e.g., Rel-17 RedCap UE) may support some features (e.g., bandwidth limit), which may reduce UE complexity. For example, a maximum bandwidth of an FR1 RedCap UE during and after initial access will be 20 MHz and a maximum bandwidth of an FR2 RedCap UE during and after initial access will be 100 MHz. The UE (e.g., Rel-18 RedCap UE) may support a maximum bandwidth limit of 5 MHz. The UE may achieve expected data rates with smaller bandwidth (e.g., less than 20 MHz for FR1 and less than 100 MHz for FR2).

In some cases, to save power consumption, the UE may be switched into a narrower active BWP. Moreover, to avoid being in a congested initial BWP, the UE may be switched to a different active BWP.

One potential issue that could impact timing accuracy is that, in these non-initial active BWPs, the UE may not see the SSB. For example, after initial access, the UE may be placed in an active BWP that does not have SSBs.

As noted above, to meet the UL transmission timing accuracy expectations, the UE may search for SSBs a predetermined time (e.g., 160 ms) before an UL transmission. However, when the UE is placed in the active BWP, it may not be possible for the UE to monitor for the SSB, which may not be present.

As a result, the UE may implement different techniques to monitor and measure SSBs (outside the active BWP). In one example, the UE may perform a BWP switch to measure the SSB. In another example, the UE may perform radio frequency (RF) retuning to measure the SSB. The RF retuning may take more time (e.g., 0.5 ms rampup time and 0.5 ms rampdown time) and is not desirable. Also, when the UE may perform the BWP switch and/or the RF retuning, the UE may consume more power and degrade throughput because of operational interruptions.

In some cases, the UE may implement a frequency hopping mechanism in an effort to achieve diversity gain across a wider channel bandwidth. However, this frequency hopping may make it difficult to schedule the SSB in the active BWP hop.

In some cases, when the UE is operating on a frequency in an unlicensed spectrum, SSBs for a reference cell timing may not be available at the UE. The SSBs may not be available, for example, because of DL clear channel assessment (CCA) failure at a network entity (as it will not transmit the SSBs since it did not gain channel access). When the SSBs are not available at the UE, the UE may rely on outdated SSB measurements, which is not desirable.

Also, in a typical DRX operation, the UE may wake up just before ON duration of the DRX cycle to measure the SSBs on the reference cell. However, given the uncertainty on the availability of the SSB due to the DL CCA failure, the UE may need to wake up much earlier in order to increase the chances of receiving the SSB. When the UE is awake for more time, it results in more power consumption by the UE.

Aspects Related to Defining Uplink (UL) Transmission Timing Accuracy

Aspects of the present disclosure provide techniques that may allow a user equipment (UE) to derive uplink (UL) transmission timing accuracy based on a type or types of reference signals (RSs) detected. Thus, even when the UE is not able to detect synchronization signal blocks (SSBs), the UE may still be able to derive UL transmission timing based on other types of RSs it is able to detect. For example, as noted above, the UE may be able to derive the UL transmission timing based on the detected presence of a first type of RS (e.g., an SSB), a second type of RS (e.g., a tracking reference signal (TRS) and/or a channel state information reference signal (CSI-RS)), or both the first and second types of RS.

FIG. 6 depicts a flow diagram illustrating example operations 600 for wireless communication. The operations 600 may be performed, for example, by a UE (e.g., such as the UE 104 in the wireless communication network 100 of FIG. 1). The operations 600 may be implemented as software components that are executed and run on one or more processors (e.g., the controller/processor 280 of FIG. 2). Further, transmission and reception of signals by the UE in operations 600 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 600 begin, at 610, by detecting at least one of a first type of RS or a second type of RS within an active BWP. For example, the UE may detect the at least one of the first type of RS or the second type of RS within the active BWP using a processor, antenna(s), and/or transceiver components of the UE 104 shown in FIG. 1 or FIG. 2 and/or of the apparatus shown in FIG. 13.

At 620, the UE derives UL transmission timing and corresponding accuracy requirement based on which type of RS was detected. The UE may derive the UL transmission timing and the corresponding accuracy requirement using a processor, antenna(s), and/or transceiver components of the UE 104 shown in FIG. 1 or FIG. 2 and/or of the apparatus shown in FIG. 13.

At 630, the UE transmits UL signals based on the derived UL transmission timing and the corresponding accuracy requirement. The UE may transmit the UL signals using antenna(s) and/or transmitter/transceiver components of the UE 104 shown in FIG. 1 or FIG. 2 and/or of the apparatus shown in FIG. 13.

FIG. 7 is a flow diagram illustrating example operations 700 for wireless communication. The operations 700 may be performed, for example, by a network entity (e.g., such as the BS 102 in the wireless communication network 100 of FIG. 1). The operations 700 may be implemented as software components that are executed and run on one or more processors (e.g., the controller/processor 240 of FIG. 2). Further, transmission and reception of signals by the network entity in operations 700 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 700 begin, at 710, by sending, to a UE, an indication to select at least one of a first type of RS or a second type of RS for deriving an UL transmission timing and corresponding accuracy requirement, when both the first type of RS and the second type of RS are present within an active BWP. For example, the network entity may send the indication to the UE to select at least one of the first type of RS or the second type of RS using antenna(s) and/or transmitter/transceiver components of the BS 102 shown in FIG. 1 or FIG. 2 and/or of the apparatus shown in FIG. 14.

At 720, the network entity receives UL signals from the UE based on the derived UL transmission timing and the corresponding accuracy requirement. For example, the network entity may receive the UL signals from the UE using antenna(s) and/or receiver/transceiver components of the BS 102 shown in FIG. 1 or FIG. 2 and/or of the apparatus shown in FIG. 14.

Figure 8:
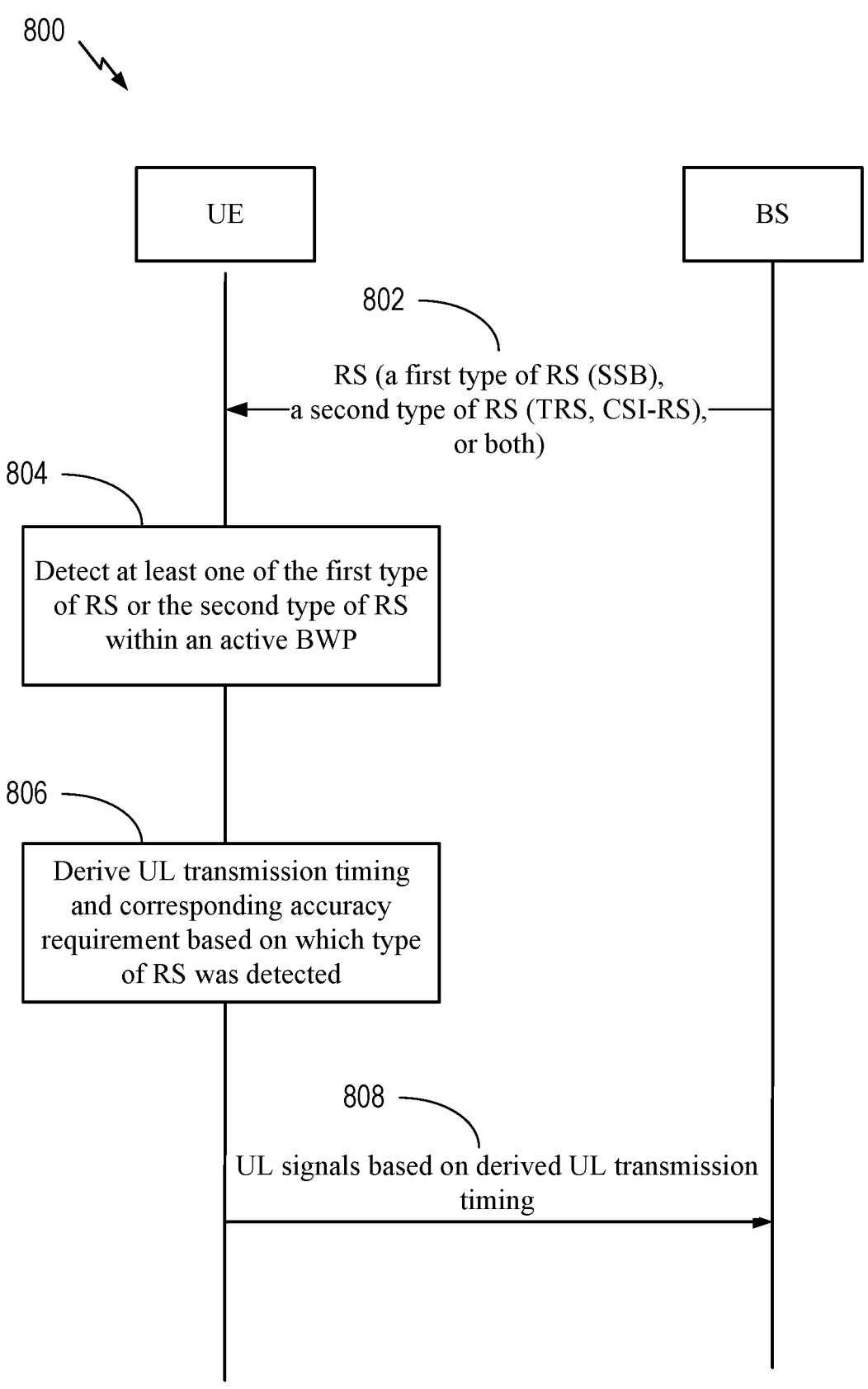
FIG. 8 depicts a call flow diagram illustrating example signaling for deriving uplink (UL) transmission timing and corresponding accuracy requirement, when at least one of a first type of reference signal (RS) or a second type of reference is within an active bandwidth part (BWP).
Figure 9:
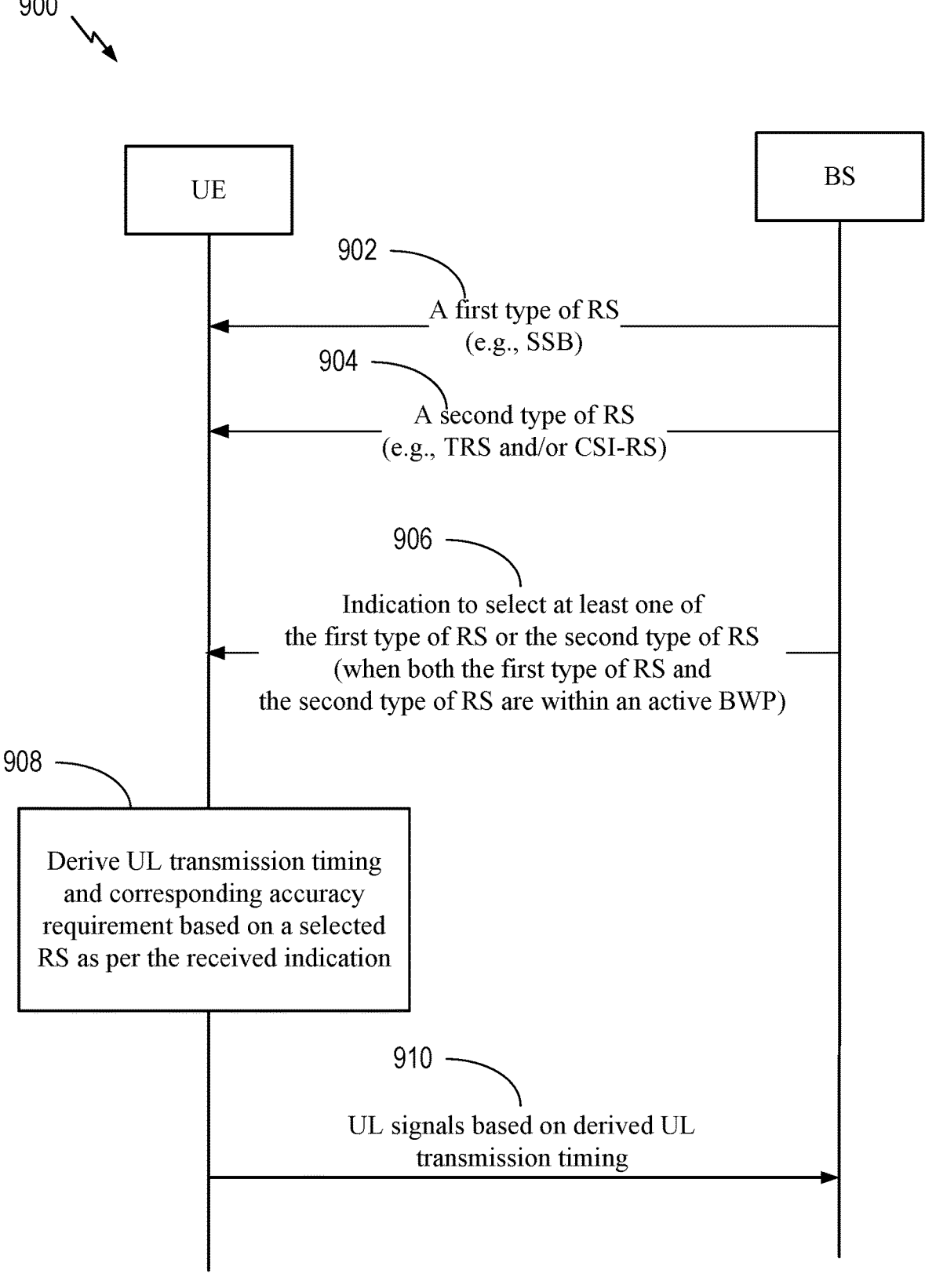
FIG. 9 depicts a call flow diagram illustrating example signaling for deriving UL transmission timing and corresponding accuracy requirement, when a first type of RS and a second type of RS are present within an active BWP.

The operations shown in FIGS. 6 and 7 may be understood with reference to the call flow diagrams of FIGS. 8 and 9.

As illustrated in FIG. 8, at 802, a BS (e.g., the BS 102 shown in FIG. 1 or FIG. 2) sends one or more RSs to a UE (e.g., the UE 104 shown in FIG. 1 or FIG. 2). The one or more RSs may include a first type of RS and a second type of RS. The first type of RS may include an SSB. The second type of RS may include a TRS and/or a CSI-RS. The BS may send the first type of RS, the second type of RS, or both the first and second types of RS.

At 804, the UE detects at least one of the first type of RS or the second type of RS within an active BWP. In one other words, depending on which type or types of RS the BS transmits, the UE may only detect the first type of RS within the active BWP, the second type of RS within the active BWP, or both the first type of RS and the second type of RS within the active BWP.

At 806, the UE derives UL transmission timing and a corresponding accuracy requirement, based on which type (or types) of RS was detected within the active BWP.

In certain aspects, when the UE detects the first type of RS within the active BWP, the UE may derive the UL transmission timing and the corresponding accuracy requirement based on the first type of RS.

In certain aspects, when the first type of RS is not present within the active BWP, the UE may derive the UL transmission timing and the corresponding accuracy requirement based on an availability of the second type of RS within the active BWP. In some cases, the second type of RS may always be available within the active BWP. In such cases, the UE may not have to perform BWP switching (or radio frequency (RF) switching) and suffer from throughput degradation to derive the UL transmission timing and the corresponding accuracy requirement. In one non-limiting example, when the UE may operate in a radio resource control (RRC) configured DL BWP without a control resource set (CORESET) or the SSB, the UE may use the CSI-RS/TRS to acquire the reference cell timing.

In certain aspects, when the UE is performing frequency hopping across different BWPs, the UE may derive the UL transmission timing and the corresponding accuracy requirement in each BWP based on an availability of at least one of the first type of RS or the second type of RS in a corresponding BWP.

For example, the UE may hop from a first BWP to a second BWP. For the first BWP, the UE may detect the first type of RS within the first BWP. The UE may derive the UL transmission timing and the corresponding accuracy requirement based on the first type of RS detected within the first BWP. For the second BWP, the UE may detect the second type of RS within the second BWP. The UE may derive the UL transmission timing and the corresponding accuracy requirement based on the second type of RS detected within the second BWP.

In certain aspects, the UE may derive the UL transmission timing and the corresponding accuracy requirement based, at least in part, on a sub carrier spacing (SCS) of an RS detected by the UE within the active BWP and/or the UL signals. In one example, when the UE may detect the first type of RS within the active BWP, the UE may derive the UL transmission timing and the corresponding accuracy requirement based on the SCS of the first type of RS and/or the UL signals. In another example, when the UE may detect the second type of RS within the active BWP, the UE may derive the UL transmission timing and the corresponding accuracy requirement based on the SCS of the second type of RS and/or the UL signals.

In certain aspects, the UE may derive the UL transmission timing and the corresponding accuracy requirement based, at least in part, on an availability of at least one of the first type of RS or the second type of RS within a last period. In some cases, the durations of a period between the first type of RS and the second type of RS may be same. In some cases, the durations of the period between the first type of RS and the second type of RS may be different. In one example, the duration of the period for the first type of RS (e.g., the SSB) may be 160 ms. In another example, the duration of the period for the second type of RS (e.g., the CSI-RS) may be 40, 80, or 320 ms.

In certain aspects, the UE may send signaling to the BS indicating a capability of the UE via a physical uplink shared channel (PUSCH) and/or a physical uplink control channel (PUCCH). In certain aspects, a duration of the period between the first type of RS and the second type of RS may be based on the capability of the UE. In one example, the capability of the UE may indicate a number of receiver (RX) branches. In another example, the capability of the UE may indicate an antenna efficiency of the UE.

In certain aspects, the UE may send signaling to the BS indicating a request for a measurement gap to measure an RS that may be outside the active BWP for deriving the UL transmission timing and the corresponding accuracy requirement. The UE may then receive (in response to the request) an indication of the measurement gap from the BS. Based on the indicated measurement gap, the UE may measure the RS (e.g., a type of RS that may not be present in the active BWP) to derive the UL transmission timing and the corresponding accuracy requirement.

In certain aspects, the UE may use a same requirement for a measurement gap to measure intra-frequency RSs outside the active BWP. The UE may then measure a signal to interference plus noise ratio (SINR), a reference signal receive power (RSRP), and/or a reference signal receive quality (RSRQ) of the intra-frequency RSs. In one example, the UE may use intra-frequency measurement gap to measure the SSB that may be present outside the active BWP for a cell mobility.

In certain aspects, the UE may derive the UL transmission timing and the corresponding accuracy requirement based on a number of tones and reference blocks (RBs) used by an RS (e.g., the first type of RS and/or the second type of RS) detected within the active BWP. In some cases, the UE may use the SSB as a source for deriving the UL transmission timing and the corresponding accuracy requirement. For example, the SSB may have a fixed sequence length. In some cases, the CSI-RS may be configured with different sequence lengths and RBs. In such cases, the UE may derive the UL transmission timing and the corresponding accuracy requirement (e.g., a higher UL transmission timing accuracy) based on wider CSI-RS resources.

At 808, the UE transmits UL signals to the BS, based on the derived UL transmission timing and the corresponding accuracy requirement.

As illustrated in FIG. 9, in some cases, a BS may indicate which type of RS a UE is to use to derive UL transmission timing and corresponding accuracy expectation.

At 902, the BS sends a first type of RS (e.g., the SSB) to the UE.

At 904, the BS sends a second type of RS (e.g., the TRS/CSI-RS) to the UE. The second type of RS and the first type of RS may be present within an active BWP.

At 906, the BS sends an indication to select at least one of the first type of RS or the second type of RS for deriving UL transmission timing and corresponding accuracy requirement (e.g., when both the first type of RS and the second type of RS are present within the active BWP).

At 908, the UE selects an RS (e.g., the first type of RS and/or the second type RS) based on the received indication, and then derives UL transmission timing and corresponding accuracy requirement based on the selected RS.

At 910, the UE transmits UL signals to the BS based on the derived UL transmission timing and the corresponding accuracy requirement.

In one example, the BS may send the indication to the UE to select the first type of RS for deriving the UL transmission timing and the corresponding accuracy requirement. In another example, the BS may send the indication to the UE to select both the first type of RS and the second type of RS for deriving the UL transmission timing and the corresponding accuracy requirement.

In one example, the BS sends the indication to the UE via system information (SI). In another example, the BS sends the indication to the UE via radio resource control (RRC) signaling. In another example, the BS sends the indication to the UE via a physical downlink control channel (PDCCH). In another example, the BS sends the indication to the UE via a medium access control (MAC) control element (CE).

FIG. 10 depicts a flow diagram illustrating example operations 1000 for wireless communication. The operations 1000 may be performed, for example, by a UE (e.g., such as the UE 104 in the wireless communication network 100 of FIG. 1). The operations 1000 may be implemented as software components that are executed and run on one or more processors (e.g., the controller/processor 280 of FIG. 2). Further, transmission and reception of signals by the UE in operations 1000 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1000 begin, at 1010, by transmitting signaling to a network entity indicating a request for a measurement gap to detect an RS outside an active BWP. For example, the UE may transmit the signaling indicating the requirement for the measurement gap using antenna(s) and/or transmitter/transceiver components of the UE 104 shown in FIG. 1 or FIG. 2 and/or of the apparatus shown in FIG. 15.

At 1020, the UE receives an indication of the measurement gap from the network entity. For example, the UE may receive the indication of the measurement gap using antenna(s) and/or receiver/transceiver components of the UE 104 shown in FIG. 1 or FIG. 2 and/or of the apparatus shown in FIG. 15.

At 1030, the UE detects the RS outside the active BWP based on the measurement gap. For example, the UE may detect the RS outside the active BWP using a processor, antenna(s) and/or transceiver components of the UE 104 shown in FIG. 1 or FIG. 2 and/or of the apparatus shown in FIG. 15.

At 1040, the UE derives UL transmission timing and corresponding accuracy requirement based on the detected RS. For example, the UE may derive the UL transmission timing and the corresponding accuracy requirement using a processor, antenna(s) and/or transceiver components of the UE 104 shown in FIG. 1 or FIG. 2 and/or of the apparatus shown in FIG. 15.

FIG. 11 is a flow diagram illustrating example operations 1100 for wireless communication. The operations 1100 may be performed, for example, by a network entity (e.g., such as the BS 102 in the wireless communication network 100 of FIG. 1). The operations 1100 may be implemented as software components that are executed and run on one or more processors (e.g., the controller/processor 240 of FIG. 2). Further, transmission and reception of signals by the network entity in operations 1100 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1100 begin, at 1110, by receiving signaling from a UE indicating a request for a measurement gap to be used by the UE to detect an RS outside an active BWP. For example, the network entity may receive the signaling indicating the requirement for the measurement gap using antenna(s) and/or receiver/transceiver components of the BS 102 shown in FIG. 1 or FIG. 2 and/or of the apparatus shown in FIG. 16.

At 1120, the network entity transmits to the UE an indication of the measurement gap to be used by the UE to measure the RS outside the active BWP and derive UL transmission timing and corresponding accuracy requirement. For example, the network entity may transmit the indication of the measurement gap using antenna(s) and/or transmitter/transceiver components of the BS 102 shown in FIG. 1 or FIG. 2 and/or of the apparatus shown in FIG. 16.

At 1130, the network entity receives UL signals from the UE based on the derived UL transmission timing and the corresponding accuracy requirement. For example, the network entity may receive the UL signals from the UE using antenna(s) and/or receiver/transceiver components of the BS 102 shown in FIG. 1 or FIG. 2 and/or of the apparatus shown in FIG. 16.

Figure 12:
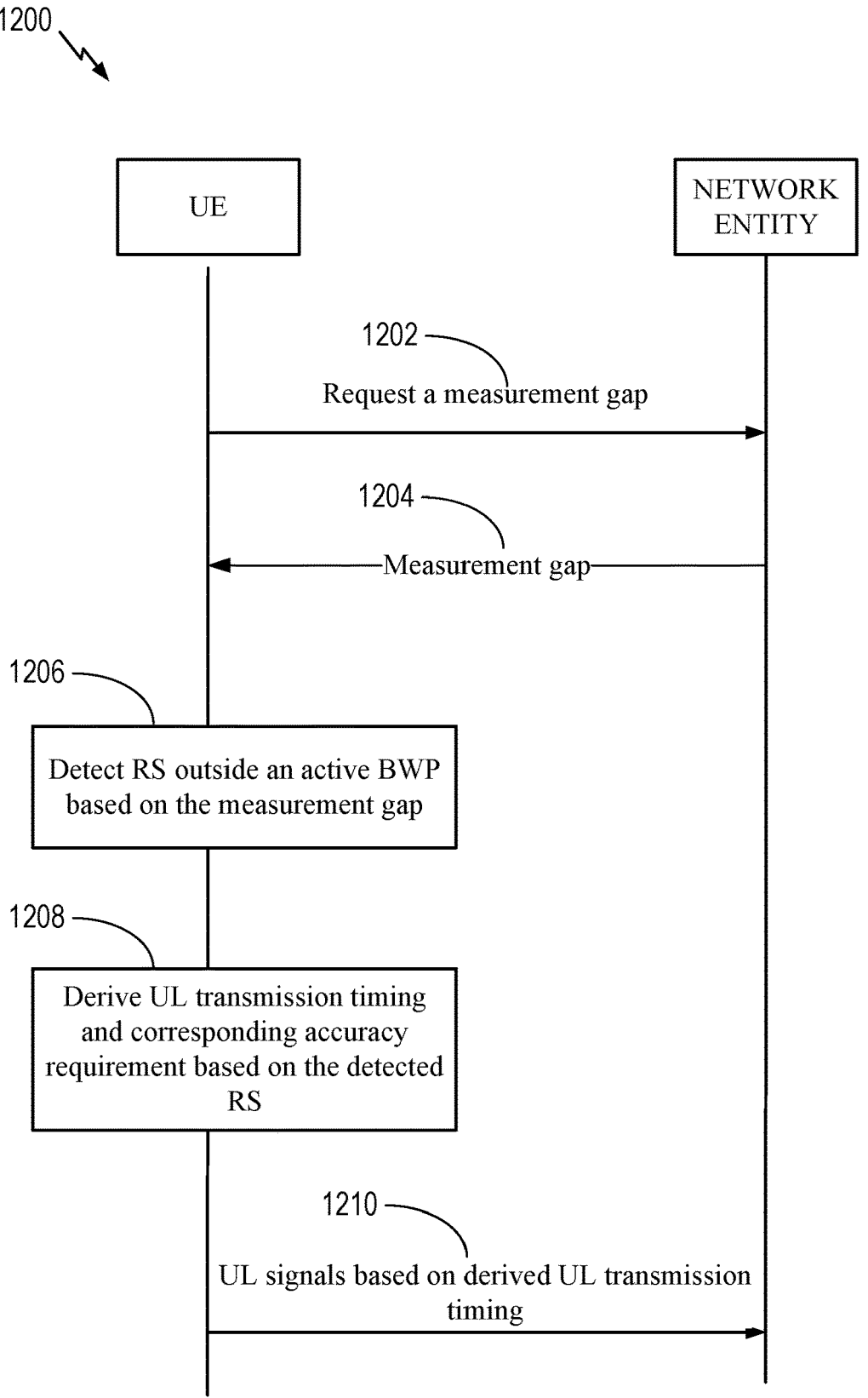
FIG. 12 depicts a call flow diagram illustrating example communication between a UE and a network entity.

The operations shown in FIGS. 10 and 11 may be understood with reference to the call flow diagram of FIG. 12.

As illustrated in FIG. 12, at 1202, a UE (e.g., the UE 104 shown in FIG. 1 or FIG. 2) transmits signaling to a network entity (e.g., the BS 102 shown in FIG. 1 or FIG. 2) indicating a requirement/request for a measurement gap to detect an RS outside an active BWP. The RS may be a first type of RS and/or a second type of RS. The first type of RS may include an SSB. The second type of RS may include a TRS and/or a CSI-RS. The measurement gap may be a set of time instances where the UE measures RSs outside the active BWP and doesn't receive anything within the active BWP (i.e., from the perspective of communication within the active BWPs, these time instances may appear like gaps).

At 1204, the UE receives an indication of the measurement gap from the network entity.

At 1206, the UE detects the RS outside the active BWP based on the measurement gap. In certain aspects, the UE may use an intra-frequency measurement gap to detect and measure the RS outside the active BWP. The intra-frequency measurement gap may be a gap instance/pattern where the UE is measuring intra-frequency objects. The intra-frequency objects may be serving cell measurement object or all neighbor cell measurement objects whose RSs center frequencies and sub-carrier spacing (SCS) are aligned as those of the serving cell measurement object.

At 1208, the UE derives UL transmission timing and corresponding accuracy requirement based on the detected RS.

At 1210, the UE transmits UL signals to the network entity, based on the derived UL transmission timing and the corresponding accuracy requirement.

Example Wireless Communication Devices

FIG. 13 depicts an example communications device 1300 that includes various components operable, configured, or adapted to perform operations for the techniques disclosed herein, such as the operations depicted and described with respect to FIG. 6. In some examples, communication device 1300 may be a user equipment (UE) 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 6, or other operations for performing the various techniques discussed herein.

In the depicted example, computer-readable medium/memory 1330 stores code 1331 for detecting at least one of a first type of reference signal (RS) or a second type of RS within an active bandwidth part (BWP), code 1332 for deriving uplink (UL) transmission timing and corresponding accuracy requirement based on which type of RS was detected, and code 1333 for transmitting UL signals based on the derived UL transmission timing and the corresponding accuracy requirement.

In the depicted example, the one or more processors 1320 include circuitry configured to implement the code stored in the computer-readable medium/memory 1330, including circuitry 1321 for detecting at least one of a first type of RS or a second type of RS within an active BWP, circuitry 1322 for deriving UL transmission timing and corresponding accuracy requirement based on which type of RS was detected, and circuitry 1323 for transmitting UL signals based on the derived UL transmission timing and the corresponding accuracy requirement.

Various components of communications device 1300 may provide means for performing the methods described herein, including with respect to FIG. 6.

In some examples, means for transmitting or sending (or means for outputting for transmission) may include the transceivers 254 and/or antenna(s) 252 of the UE 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the UE 104 illustrated in FIG. 2 and/or transceiver 1308 and antenna 1310 of the communication device 1300 in FIG. 13.

In some examples, means for detecting at least one of a first type of RS or a second type of RS within an active BWP, means for deriving UL transmission timing and corresponding accuracy requirement based on which type of RS was detected, and means for transmitting UL signals based on the derived UL transmission timing and the corresponding accuracy requirement, may include various processing system components, such as: the one or more processors 1320 in FIG. 13, or aspects of the UE 104 depicted in FIG. 2, including receive processor 258, transmit processor 264, TX MIMO processor 266, and/or controller/processor 280 (including RS component 281).

Notably, FIG. 13 is just use example, and many other examples and configurations of communication device 1300 are possible.

FIG. 14 depicts an example communications device 1400 that includes various components operable, configured, or adapted to perform operations for the techniques disclosed herein, such as the operations depicted and described with respect to FIG. 7. In some examples, communication device 1400 may be a base station (BS) 102 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIG. 7, or other operations for performing the various techniques discussed herein.

In the depicted example, computer-readable medium/memory 1430 stores code 1431 for sending to a UE an indication to select at least one of a first type of RS or a second type of RS for deriving an UL transmission timing and corresponding accuracy requirement when both the first type of RS and the second type of RS are present within an active BWP and code 1432 for receiving from the UE UL signals based on the derived UL transmission timing and the corresponding accuracy requirement.

In the depicted example, the one or more processors 1420 include circuitry configured to implement the code stored in the computer-readable medium/memory 1430, including circuitry 1421 for sending to a UE an indication to select at least one of a first type of RS or a second type of RS for deriving an UL transmission timing and corresponding accuracy requirement when both the first type of RS and the second type of RS are present within an active BWP and circuitry 1422 for receiving from the UE UL signals based on the derived UL transmission timing and the corresponding accuracy requirement.

Various components of communications device 1400 may provide means for performing the methods described herein, including with respect to FIG. 7.

In some examples, means for transmitting or sending (or means for outputting for transmission) may include the transceivers 232 and/or antenna(s) 234 of the BS 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the BS 102 illustrated in FIG. 2 and/or transceiver 1408 and antenna 1410 of the communication device 1400 in FIG. 14.

In some examples, means for sending to a UE an indication to select at least one of a first type of RS or a second type of RS for deriving an UL transmission timing and corresponding accuracy requirement when both the first type of RS and the second type of RS are present within an active BWP and means for receiving from the UE UL signals based on the derived UL transmission timing and the corresponding accuracy requirement, may include various processing system components, such as: the one or more processors 1420 in FIG. 14, or aspects of the BS 102 depicted in FIG. 2, including receive processor 238, transmit processor 220, TX MIMO processor 230, and/or controller/processor 240 (including RS component 241).

Notably, FIG. 14 is just use example, and many other examples and configurations of communication device 1400 are possible.

Figure 15:
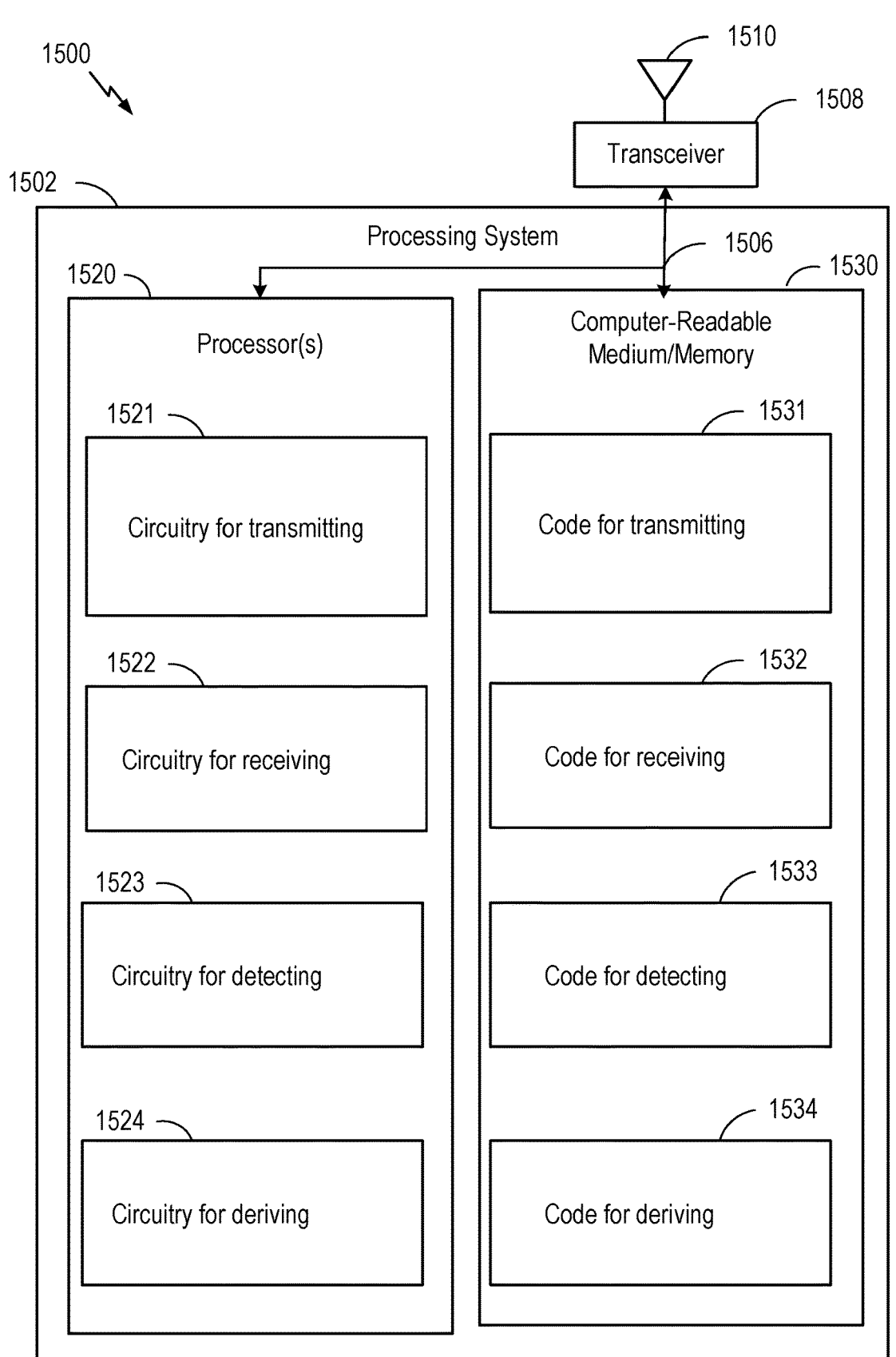
FIG. 15 depicts aspects of an example communications device.

FIG. 15 depicts an example communications device 1500 that includes various components operable, configured, or adapted to perform operations for the techniques disclosed herein, such as the operations depicted and described with respect to FIG. 10. In some examples, communication device 1500 may be a UE 104 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 10, or other operations for performing the various techniques discussed herein.

In the depicted example, computer-readable medium/memory 1530 stores code 1531 for transmitting signaling to a network entity indicating a request for a measurement gap to detect an RS outside an active BWP, code 1532 for receiving an indication of the measurement gap from the network entity, code 1533 for detecting the RS outside the active BWP based on the measurement gap, and code 1534 for deriving UL transmission timing and corresponding accuracy requirement based on the detected RS.

In the depicted example, the one or more processors 1520 include circuitry configured to implement the code stored in the computer-readable medium/memory 1530, including circuitry 1521 for transmitting signaling to a network entity indicating a request for a measurement gap to detect an RS outside an active BWP, circuitry 1522 for receiving an indication of the measurement gap from the network entity, circuitry 1523 for detecting the RS outside the active BWP based on the measurement gap, and circuitry 1524 for deriving UL transmission timing and corresponding accuracy requirement based on the detected RS.

Various components of communications device 1500 may provide means for performing the methods described herein, including with respect to FIG. 10.

In some examples, means for transmitting or sending (or means for outputting for transmission) may include the transceivers 254 and/or antenna(s) 252 of the UE 104 illustrated in FIG. 2 and/or transceiver 1508 and antenna 1510 of the communication device 1500 in FIG. 15.

In some examples, means for receiving (or means for obtaining) may include the transceivers 254 and/or antenna(s) 252 of the UE 104 illustrated in FIG. 2 and/or transceiver 1508 and antenna 1510 of the communication device 1500 in FIG. 15.

In some examples, means for transmitting signaling to a network entity indicating a request for a measurement gap to detect an RS outside an active BWP, means for receiving an indication of the measurement gap from the network entity, means for detecting the RS outside the active BWP based on the measurement gap, means for deriving UL transmission timing and corresponding accuracy requirement based on the detected RS, may include various processing system components, such as: the one or more processors 1520 in FIG. 15, or aspects of the UE 104 depicted in FIG. 2, including receive processor 258, transmit processor 264, TX MIMO processor 266, and/or controller/processor 280 (including RS component 281).

Notably, FIG. 15 is just use example, and many other examples and configurations of communication device 1500 are possible.

Figure 16:
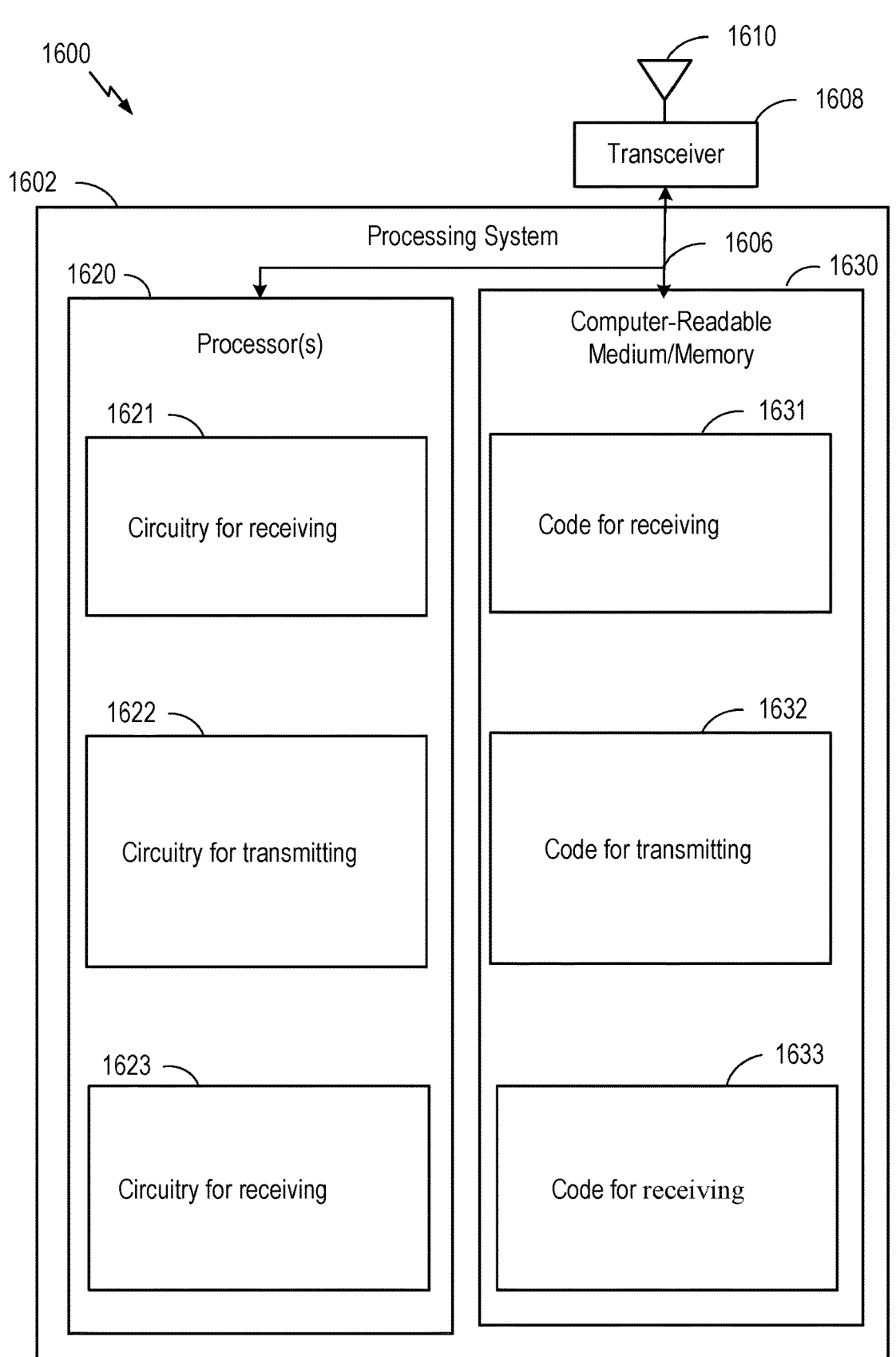
FIG. 16 depicts aspects of an example communications device.

FIG. 16 depicts an example communications device 1600 that includes various components operable, configured, or adapted to perform operations for the techniques disclosed herein, such as the operations depicted and described with respect to FIG. 11. In some examples, communication device 1600 may be a BS 102 as described, for example with respect to FIGS. 1 and 2.

Communications device 1600 includes a processing system 1602 coupled to a transceiver 1608 (e.g., a transmitter and/or a receiver). Transceiver 1608 is configured to transmit (or send) and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes one or more processors 1620 coupled to a computer-readable medium/memory 1630 via a bus 1606. In certain aspects, computer-readable medium/memory 1630 is configured to store instructions (e.g., computer-executable code) that when executed by the one or more processors 1620, cause the one or more processors 1620 to perform the operations illustrated in FIG. 11, or other operations for performing the various techniques discussed herein.

In the depicted example, computer-readable medium/memory 1630 stores code 1631 for receiving signaling from a UE indicating a request for a measurement gap to be used by the UE to detect an RS outside an active BWP, code 1632 for transmitting to the UE an indication of the measurement gap to be used by the UE to measure the RS outside the active BWP and derive UL transmission timing and corresponding accuracy requirement, and code 1633 for receiving UL signals from the UE based on the derived UL transmission timing and the corresponding accuracy requirement.

In the depicted example, the one or more processors 1620 include circuitry configured to implement the code stored in the computer-readable medium/memory 1630, including circuitry 1621 for receiving signaling from a UE indicating a request for a measurement gap to be used by the UE to detect an RS outside an active BWP, circuitry 1622 for transmitting to the UE an indication of the measurement gap to be used by the UE to measure the RS outside the active BWP and derive UL transmission timing and corresponding accuracy requirement, and circuitry 1623 for receiving UL signals from the UE based on the derived UL transmission timing and the corresponding accuracy requirement.

Various components of communications device 1600 may provide means for performing the methods described herein, including with respect to FIG. 11.

In some examples, means for transmitting or sending (or means for outputting for transmission) may include the transceivers 232 and/or antenna(s) 234 of the BS 102 illustrated in FIG. 2 and/or transceiver 1608 and antenna 1610 of the communication device 1600 in FIG. 16.

In some examples, means for receiving (or means for obtaining) may include the transceivers 232 and/or antenna(s) 234 of the BS 102 illustrated in FIG. 2 and/or transceiver 1608 and antenna 1610 of the communication device 1600 in FIG. 16.

In some examples, means for receiving signaling from a UE indicating a request for a measurement gap to be used by the UE to detect an RS outside an active BWP, means for transmitting to the UE an indication of the measurement gap to be used by the UE to measure the RS outside the active BWP and derive UL transmission timing and corresponding accuracy requirement, and means for receiving UL signals from the UE based on the derived UL transmission timing and the corresponding accuracy requirement, may include various processing system components, such as: the one or more processors 1620 in FIG. 16, or aspects of the BS 102 depicted in FIG. 2, including receive processor 238, transmit processor 220, TX MIMO processor 230, and/or controller/processor 240 (including RS component 241).

Notably, FIG. 16 is just use example, and many other examples and configurations of communication device 1600 are possible.

Example Clauses

Implementation examples are described in the following numbered clauses:

Clause 1: A method for wireless communications by a user equipment (UE), comprising: detecting at least one of a first type of reference signal (RS) or a second type of RS within an active bandwidth part (BWP); deriving uplink (UL) transmission timing and corresponding accuracy requirement, based on which type of RS was detected; and transmitting UL signals based on the derived UL transmission timing and the corresponding accuracy requirement.

Clause 2: The method alone or in combination with the first clause, wherein: the first type of RS comprises a synchronization signal block (SSB); and the second type of RS comprises at least one of a tracking reference signal (TRS) or a channel state information reference signal (CSI-RS).

Clause 3: The method alone or in combination with one or more of the first and second clauses, wherein the UL transmission timing and the corresponding accuracy requirement is derived based on the first type of RS, when the first type of RS is detected.

Clause 4: The method alone or in combination with one or more of the first through third clauses, further comprising receiving an indication, from a network entity, to select at least one of the first type of RS or the second type of RS for deriving the UL transmission timing and the corresponding accuracy requirement, when both the first type of RS and the second type of RS are within the active BWP.

Clause 5: The method alone or in combination with one or more of the first through fourth clauses, wherein the indication is received via at least one of: system information (SI), radio resource control (RRC) signaling, a physical downlink control channel (PDCCH), or a medium access control (MAC) control element (CE).

Clause 6: The method alone or in combination with one or more of the first through fifth clauses, wherein the UL transmission timing and the corresponding accuracy requirement is derived based on an availability of the second type of RS, when the first type of RS is not present within the active BWP.

Clause 7: The method alone or in combination with one or more of the first through sixth clauses, wherein the UL transmission timing and the corresponding accuracy requirement is based on a sub carrier spacing (SCS) of an RS detected by the UE and the UL signals.

Clause 8: The method alone or in combination with one or more of the first through seventh clauses, wherein the UL transmission timing and the corresponding accuracy requirement is based on an availability of at least one of the first type of RS or the second type of RS within a last period.

Clause 9: The method alone or in combination with one or more of the first through eighth clauses, wherein durations of a period between the first type of RS and the second type of RS are different.

Clause 10: The method alone or in combination with one or more of the first through ninth clauses, wherein a duration of the period between the first type of RS and the second type of RS is based on a capability of the UE indicating a number of receiver (RX) branches.

Clause 11: The method alone or in combination with one or more of the first through tenth clauses, wherein a duration of the period between the first type of RS and the second type of RS is based on a capability of the UE indicating an antenna efficiency of the UE.

Clause 12: The method alone or in combination with one or more of the first through eleventh clauses, further comprising sending signaling, to a network entity, indicating the capability of the UE via at least one of: a physical uplink shared channel (PUSCH) or a physical uplink control channel (PUCCH).

Clause 13: The method alone or in combination with one or more of the first through twelfth clauses, further comprising: sending signaling, to a network entity, indicating a requirement for a measurement gap to measure an RS that is outside the active BWP; and receiving, from a network entity, an indication of the measurement gap to measure the RS that is outside the active BWP for deriving the UL transmission timing and the corresponding accuracy requirement.

Clause 14: The method alone or in combination with one or more of the first through thirteenth clauses, wherein the UE uses a same requirement for the measurement gap to measure intra-frequency RSs that are outside the active BWP.

Clause 15: The method alone or in combination with one or more of the first through fourteenth clauses, further comprising measuring at least one of: a signal to interference plus noise ratio (SINR), a reference signal receive power (RSRP), or a reference signal receive quality (RSRQ) of the intra-frequency RSs.

Clause 16: The method alone or in combination with one or more of the first through fifteenth clauses, wherein the UL transmission timing and the corresponding accuracy requirement is based on a number of tones and reference blocks (RBs) used by at least one of the first type of RS or the second type of RS.

Clause 17: A method for wireless communications by a network entity, comprising: sending, to a user equipment (UE), an indication to select at least one of a first type of reference signal (RS) or a second type of RS for deriving an uplink (UL) transmission timing and corresponding accuracy requirement, when both the first type of RS and the second type of RS are present within an active bandwidth part (BWP); and receiving, from the UE, UL signals based on the derived UL transmission timing and the corresponding accuracy requirement.

Clause 18: The method alone or in combination with the seventeenth clause, wherein: the first type of RS comprises a synchronization signal block (SSB); and the second type of RS comprises at least one of a tracking reference signal (TRS) or a channel state information reference signal (CSI-RS).

Clause 19: The method alone or in combination with one or more of the seventeenth and eighteenth clauses, wherein the UL transmission timing and the corresponding accuracy requirement is based on an availability of at least one of the first type of RS or the second type of RS within a last period.

Clause 20: The method alone or in combination with one or more of the seventeenth through nineteenth clauses, wherein durations of a period between the first type of RS and the second type of RS are different.

Clause 21: The method alone or in combination with one or more of the seventeenth through twentieth clauses, wherein a duration of the period between the first type of RS and the second type of RS is based on a capability of the UE indicating a number of receiver (RX) branches.

Clause 22: The method alone or in combination with one or more of the seventeenth through twenty-first clauses, wherein a duration of the period between the first type of RS and the second type of RS is based on a capability of the UE indicating an antenna efficiency of the UE.

Clause 23: The method alone or in combination with one or more of the seventeenth through twenty-second clauses, further comprising receiving signaling, from the UE, indicating the capability of the UE via at least one of: a physical uplink shared channel (PUSCH) or a physical uplink control channel (PUCCH).

Clause 24: The method alone or in combination with one or more of the seventeenth through twenty-third clauses, further comprising: receiving signaling, from the UE, indicating a requirement for a measurement gap to measure an RS that is outside the active BWP; and sending, to the UE, an indication of the measurement gap to measure the RS that is outside the active BWP for deriving the UL transmission timing and the corresponding accuracy requirement.

Clause 25: The method alone or in combination with one or more of the seventeenth through twenty-fourth clauses, wherein the UL transmission timing is based on a number of tones and reference blocks (RBs) used by at least one of the first type of RS or the second type of RS.

Clause 26: A method for wireless communications by a user equipment (UE), comprising: transmitting signaling to a network entity indicating a request for a measurement gap to detect a reference signal (RS) outside an active bandwidth part (BWP); receiving an indication of the measurement gap from the network entity; detecting the RS outside the active BWP based on the measurement gap; and deriving uplink (UL) transmission timing and corresponding accuracy requirement based on the detected RS.

Clause 27: The method alone or in combination with the twenty-sixth clause, wherein the RS is a first type of RS, and wherein the first type of RS comprises a synchronization signal block (SSB).

Clause 28: The method alone or in combination with the twenty-sixth clause, wherein the RS is a second type of RS, and wherein the second type of RS comprises at least one of a tracking reference signal (TRS) or a channel state information reference signal (CSI-RS).

Clause 29: The method alone or in combination with the twenty-sixth clause, wherein the detecting comprises measuring the RS to derive the UL transmission timing and corresponding accuracy requirement.

Clause 30: The method alone or in combination with the twenty-sixth clause, further comprising using an intra-frequency measurement gap to detect and measure the RS outside the active BWP.

Clause 31: A method for wireless communications by a network entity, comprising: receiving signaling from a user equipment (UE) indicating a request for a measurement gap to be used by the UE to detect a reference signal (RS) outside an active bandwidth part (BWP); transmitting to the UE an indication of the measurement gap to be used by the UE to measure the RS outside the active BWP and derive uplink (UL) transmission timing and corresponding accuracy requirement; and receiving UL signals from the UE based on the derived UL transmission timing and the corresponding accuracy requirement.

Clause 32: The method alone or in combination with the thirty-first clause, wherein the RS is a first type of RS, and wherein the first type of RS comprises a synchronization signal block (SSB).

Clause 33: The method alone or in combination with the thirty-first clause, wherein the RS is a second type of RS, and wherein the second type of RS comprises at least one of a tracking reference signal (TRS) or a channel state information reference signal (CSI-RS).

Clause 34: An apparatus, comprising: a memory comprising executable instructions; one or more processors configured to execute the executable instructions and cause the apparatus to perform a method in accordance with any one of Clauses 1-33.

Clause 35: An apparatus, comprising means for performing a method in accordance with any one of Clauses 1-33.

Clause 36: A non-transitory computer-readable medium comprising executable instructions that, when executed by one or more processors of an apparatus, cause the apparatus to perform a method in accordance with any one of Clauses 1-33.

Clause 37: A computer program product embodied on a computer-readable storage medium comprising code for performing a method in accordance with any one of Clauses 1-33.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/ or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2\mu$ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of defining uplink (UL) transmission timing accuracy in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    transmitting signaling to a network entity, the signaling indicating a request for a measurement gap to detect a reference signal (RS) outside an active bandwidth part (BWP);
        receiving an indication of the measurement gap from the network entity;
        detecting the RS outside the active BWP based on the measurement gap; and
        deriving uplink (UL) transmission timing and corresponding accuracy requirement based on a measurement of the RS detected outside the active BWP.

2. The method of claim 1, wherein the RS comprises a synchronization signal block (SSB).

3. The method of claim 1, wherein the RS comprises at least one of a tracking reference signal (TRS) or a channel state information reference signal (CSI-RS).

4. The method of claim 1, wherein the detecting comprises performing the measurement of the RS outside the active BWP to derive the UL transmission timing and the corresponding accuracy requirement.

5. The method of claim 1, further comprising using an intra-frequency measurement gap to detect and measure the RS outside the active BWP.

6. A method for wireless communications by a user equipment (UE), comprising:
    detecting at least one of a first type of reference signal (RS) or a second type of RS within an active bandwidth part (BWP);
    deriving uplink (UL) transmission timing and corresponding accuracy requirement, based on which type of RS is detected within the active BWP; and
    transmitting UL signals based on the derived UL transmission timing and the corresponding accuracy requirement.

7. The method of claim 6, wherein:
    the first type of RS comprises a synchronization signal block (SSB); and
    the second type of RS comprises at least one of a tracking reference signal (TRS) or a channel state information reference signal (CSI-RS).

8. The method of claim 6, wherein the deriving comprises deriving the UL transmission timing and the corresponding accuracy requirement based on the first type of RS, when the first type of RS is detected within the active BWP.

9. The method of claim 6, further comprising receiving an indication, from a network entity, to select at least one of the first type of RS or the second type of RS for deriving the UL transmission timing and the corresponding accuracy requirement, when both the first type of RS and the second type of RS are detected within the active BWP.

10. The method of claim 9, wherein the indication is received via at least one of: system information (SI), radio resource control (RRC) signaling, a physical downlink control channel (PDCCH), or a medium access control (MAC) control element (CE).

11. The method of claim 6, wherein the deriving comprises deriving the UL transmission timing and the corresponding accuracy requirement based on an availability of the second type of RS, when the first type of RS is not detected within the active BWP.

12. The method of claim 6, wherein the UL transmission timing and the corresponding accuracy requirement are based on a sub carrier spacing (SCS) of an RS detected by the UE and the UL signals.

13. The method of claim 6, wherein the UL transmission timing and the corresponding accuracy requirement are based on an availability of at least one of the first type of RS or the second type of RS within a last period.

14. The method of claim 13, wherein durations of a period between the first type of RS and the second type of RS are different.

15. The method of claim 14, wherein a duration of the period between the first type of RS and the second type of RS is based on a capability of the UE indicating a number of receiver (RX) branches.

16. The method of claim 14, wherein a duration of the period between the first type of RS and the second type of RS is based on a capability of the UE indicating an antenna efficiency of the UE.

17. The method of claim 16, further comprising sending signaling, to a network entity, indicating the capability of the UE via at least one of: a physical uplink shared channel (PUSCH) or a physical uplink control channel (PUCCH).

18. The method of claim 6, further comprising:

sending signaling, to a network entity, indicating a requirement for a measurement gap to measure an RS outside the active BWP; and receiving, from the network entity, an indication of the measurement gap to measure the RS outside the active BWP for deriving the UL transmission timing and the corresponding accuracy requirement.

19. The method of claim 18, further comprising using the measurement gap to measure intra-frequency RSs outside the active BWP.

20. The method of claim 19, further comprising measuring at least one of: a signal to interference plus noise ratio (SINR), a reference signal receive power (RSRP), or a reference signal receive quality (RSRQ) of the intra-frequency RSs.

21. The method of claim 6, wherein the UL transmission timing and the corresponding accuracy requirement are based on a number of tones and reference blocks (RBs) used by at least one of the first type of RS or the second type of RS.

22. A user equipment (UE) configured for wireless communications, comprising:

a memory comprising computer-executable instructions; and a processor configured to execute the computer-executable instructions and cause the UE to:

transmit signaling to a network entity, the signaling indicating a request for a measurement gap to detect a reference signal (RS) outside an active bandwidth part (BWP);

receive an indication of the measurement gap from the network entity;

detect the RS outside the active BWP based on the measurement gap; and derive uplink (UL) transmission timing and corresponding accuracy requirement based on a measurement of the RS detected outside the active BWP.

23. The UE of claim 22, wherein the RS comprises a synchronization signal block (SSB).

24. The UE of claim 22, wherein the RS comprises at least one of a tracking reference signal (TRS) or a channel state information reference signal (CSI-RS).

25. The UE of claim 22, wherein the detection comprises the measurement of the RS outside the active BWP to derive the UL transmission timing and the corresponding accuracy requirement.

26. The UE of claim 25, wherein the processor is further configured to execute the computer-executable instructions and cause the UE to: use an intra- frequency measurement gap to detect and measure the RS outside the active BWP.

27. A user equipment (UE) configured for wireless communications, comprising:

a memory comprising computer-executable instructions; and a processor configured to execute the computer-executable instructions and cause the UE to:

detect at least one of a first type of reference signal (RS) or a second type of RS within an active bandwidth part (BWP);

derive uplink (UL) transmission timing and corresponding accuracy requirement, based on which type of RS is detected within the active BWP; and transmit UL signals based on the derived UL transmission timing and the corresponding accuracy requirement.

28. The UE of claim 27, wherein the UL transmission timing and the corresponding accuracy requirement are based on an availability of at least one of the first type of RS or the second type of RS within a last period.

29. The UE of claim 27, wherein the UL transmission timing and the corresponding accuracy requirement are based on a number of tones and reference blocks (RBs) used by at least one of the first type of RS or the second type of RS.

* * * * *